United States Patent
Li et al.

(10) Patent No.: US 10,440,048 B1
(45) Date of Patent: Oct. 8, 2019

(54) ANTI-ATTACKING MODELLING FOR CMD SYSTEMS BASED ON GSPN AND MARTINGALE THEORY

(71) Applicants: PEKING UNIVERSITY SHENZHEN GRADUATE SCHOOL, Shenzhen (CN); Foshan Saisichan Tech Ltd., Foshan (CN); CHINA NATIONAL DIGITAL SWITCHING SYSTEM ENGINEERING & TECHNOLOGICAL R&D CENTER, Zhengzhou (CN)

(72) Inventors: Hui Li, Shenzhen (CN); Jiangxing Wu, Shenzhen (CN); Xin Yang, Shenzhen (CN); Peng Yi, Shenzhen (CN); Shuo-yen Robert Li, Shenzhen (CN)

( * ) Notice: Subject to any disclaimer, the term of this patent is extended or adjusted under 35 U.S.C. 154(b) by 0 days.

(21) Appl. No.: 16/228,513

(22) Filed: Dec. 20, 2018

Related U.S. Application Data

(63) Continuation of application No. PCT/CN2018/113980, filed on Nov. 5, 2018.

(51) Int. Cl.
*H04L 29/06* (2006.01)
*G06N 20/00* (2019.01)
*G06N 7/00* (2006.01)

(52) U.S. Cl.
CPC ......... *H04L 63/1441* (2013.01); *G06N 7/005* (2013.01); *G06N 20/00* (2019.01); *H04L 63/1425* (2013.01); *H04L 63/1433* (2013.01); *H04L 63/20* (2013.01)

(58) Field of Classification Search
CPC ..... H04L 63/1441; G06N 20/00; G06N 7/005
USPC .................................................... 726/22–25
See application file for complete search history.

(56) References Cited

U.S. PATENT DOCUMENTS

| | | | | |
|---|---|---|---|---|
| 2012/0303924 | A1* | 11/2012 | Ross ........................ | G06F 7/58 711/170 |
| 2013/0326625 | A1* | 12/2013 | Anderson ............... | G06F 21/56 726/23 |

* cited by examiner

*Primary Examiner* — Anthony D Brown
(74) *Attorney, Agent, or Firm* — Zheng Andy Liu

(57) ABSTRACT

A method comprising: S1. dividing attack and defense processes associated with a computer network system into first one or more single-node attacks and second one or more link attacks based on attack granularity; S2. determining one or more single-node attack parameters associated with the computer network system based on configuration of the computer network system; S3. calculating (1) success probability and (2) time length of a single node attack by applying GSPN theory to mathematically analyze the determined one or more single-node attack parameters; S4. based on the success probability of the attacking single node as a parameter, using the Markov chain and the Martingale theory to calculate an average number of steps required for a successful link attack; and S5. calculating a total theoretical average attack time based on the average number of steps required for a successful link attack and the time length of a single node attack.

10 Claims, 19 Drawing Sheets

ANTI-ATTACKING MODELLING FOR CMD SYSTEMS BASED ON GSPN AND MARTINGALE THEORY

CROSS REFERENCE TO RELATED APPLICATION

This application is a continuation of PCT patent application no. PCT/CN2018/113980, filed Nov. 5, 2018, entitled "Anti-attacking modelling for CMD systems based on GSPN and Martingale theory," which is hereby incorporated by reference in its entirety.

TECHNICAL FIELD

The present disclosure generally to computer network security, and particularly relates to anti-attacking modeling for Cyber Mimic Defense (CMD) systems based on Generalized Stochastic Petri Net (GSPN) and martingale theory.

BACKGROUND

In recent years, network security beaches have occurred, and users gradually pay more their attention to the issue of cyber security. In traditional networks, attackers and defenders are in unequal positions. After a defender completes the initial configuration, the attackers can reconnoiter the information of the defender at any time persistently and plan attacks. Once attackers acquire the privilege, they can keep that privilege for a long time without being removed. This greatly threatens network security.

Technical challenges, therefore, remain to handle network security more effectively and efficiently.

SUMMARY

The object of the present disclosure is to provide a security modeling and quantification method for cyber mimic defense based on GSPN and Martingale theory, aiming at solving the above-mentioned technical problem. Based on GSPN and Martingale theory, the security modeling and quantification method for cyber mimic defense include the following steps:

S1. In the actual system, the attack and defense process of the distributed MDA is divided into a single-node attack and a link attack according to the attack granularity;

S2. The single node attack parameters of a mimic model perform an abstract extraction of the configuration of the actual system;

S3. Analyze and calculate a single node attacking success probability and a single node attacking time according to the acquired single node attack parameters by using GSPN theory;

S4. Use the success probability of attacking a single node as a parameter to calculate an average expected number of steps of a successful link attack with Markov chain and Martingale theory;

S5. Obtain the total theoretical average attack time according to the obtained average expectation number of steps in the successful link attack and expectation attacking time in the single node attack.

A further technical solution of the present disclosure is that the single-node attack is to take an independent functional component in the attack process as a node, and when the node is attacked, the defending party performs on the attacked executor according to the attacked situation with one of the actions of the driving (D), mis-driving (M), stopping (S), and judging (J).

According to a further technical solution of the present disclosure, the GSPN model in the step S3 is that the attacker and the defender form a game in the actual system. The different behaviors of the attacker and the defender have different influences on the outputting state of the single node. The game theory is used to describe the different effects in outputting state of the single node. According to the engraved influence, a generalized stochastic Petri net (GSPN) model is established. The method of establishing a generalized stochastic Petri net (GSPN) model includes the following steps:

S31. Extract the attacker's behavior and the impact of those behaviors to establish a generalized stochastic Petri net of the attacker's perspective;

S32. Extract the defender's behavior and the impact of those behaviors to establish a generalized stochastic Petri net of the defender's perspective; and S33. Combine the behaviors and states of the generalized stochastic Petri nets of the attacker's perspective and the defender's perspective to establish a generalized stochastic Petri net model;

According to a further technical solution of the present disclosure, the attack and defense behaviors of the attacker and the defender in the game cause the system to have different states according to different attack results including: normal working (A), non-specific perception (B), attrition (C), pervasion (D) and exfiltration (E).

The normal work (A) is that the attacker does not launch an attack or does not have any successful attack so that all the executors are in the normal operation.

The non-specific perception (B) is that when the attacker attacks the system, but the number of attacked executors is too less to confuse the voter. When the results are sent to the voter, the few different executors with wrong results will be discovered and be replaced.

The attrition (C) is when the attacker launch attacks to the most of executors with different tampering result. When the results are sent to the voter, there are no results that is more than half of the total. The voter has no approved result to the output. For example, the first and second executors are attacked, but the results of them are different, and neither of them is as same as the third one. The voter receives three different results, and cannot output result.

The pervasion (D) is that the attacker attacks the most of executors with the same tampering result. When the results are sent to the voter, the tampered results are more than half of the total. The voter outputs tampered results and replace the few innocent executors. For example, the first and second executors are attacked, and the result of them are identical. As a result, the voter outputs this result and marks the third executor as attacked executors.

The exfiltration (E) is when the attacker launches enough powerful attacks in a short time and tampers all the results to the same wrong, the aggressor controls this node with no alarm to the defenders. At this moment the system is in the most critical state because the aggressor can instrument a devastating attack at any time.

According to a further technical solution of the present disclosure, the defensive behavior of the attacker and the defender in the game causes the defender to perform a transition between different states during the attack and defense process.

A further technical solution of the present disclosure is that after the attacker attacks an executor successfully, for each normal working executor the probability of having outputted the result is:

$$P_{1w} = P\{N(t_\alpha) - N(0) > 0\}$$

So the probability that the other executors' output k results, which means that the voter is ready for arbitration (t(1, B, J)) is:

$$P_{1M}{}^J = P_{1M}{}^K$$

The probability of a executor outputting a result during attacking i (0≤i≤N) executors is:

$$P_{2M}{}^J = P\{N(t_\alpha + \alpha t_\alpha + \ldots + \alpha^{i-1} t_\alpha) - N(0) > 0\}$$

The possibility of the system performing CMD arbitration $(t_{(i, C, J)}, t_{(2, D, J)})$ is:

$$P_{iM}{}^J = P_{iM}{}^K$$

Where N(t) represents the number of times, the executor outputs the result in the t time interval from the start of the task distribution. $t_\alpha$ means time of attacking an executor. α=1 means in the general attack and α=0.5 means in the special attack. N is the number of working executors in the system, and K is the threshold of the same number of output results, 0≤i≤N−K.

According to a further technical solution of the present disclosure, the link attack takes the steady state time of a single node as the disturbing period of the system. The attacker advances along the attack chain. Each attack succeeds one node, the attacker goes down one step along the attack chain. If the attacker encounters the mimic stochastic disturb, the attack moves back along the attack chain. If the attacker does not encounter the mimic stochastic disturb, the attacker continues to attack the next node.

A further technical solution of the present disclosure is: in the link attack, according to whether encountering the mimic stochastic perturbation or not and whether the single node is successfully attacked, the attack has three possible moving directions after one period: going to the next node, going back to the last node, or staying at the same node.

A further technical solution of the present disclosure is: the back-off is that whether the attacker launches an attack successfully or not, as long as the node from which the attack originates encounters the reshuffle, the attack cannot be performed, and the attacker must fall back off to the previous node that has broken, where the probability is Mi, i−1=ω. Going to the next node: the probability that the attacker attacks the next node successfully is μ, and the probability that the system does not stochastically disturb the attack-related node during the transformation period is (1−ω), so the probability that attacker successfully attacks the next node without any disturbing is Mi, i−1=(1−ω) μ. The stand-still motion is when the attacker unsuccessfully attacks the next node and the system does not stochastically disturb the relevant node. At this time, the state of the system remains unchanged, and the probability is $M_{i,j} = (1-\omega)(1-\mu)$.

A further technical solution of the present disclosure is that the step S4 further includes the following steps:

S41. Create a Markov chain according to the staying position of attack at the current state and a next attack range.

S42. Convert the established Markov chain into a Martingale sequence;

S43. Calculate the number of steps required by the attacker to successfully attack the target node by using the stop time theory in Martingale:

$$E[S] = \frac{\theta}{(1-\omega)(\mu-\omega)}$$

S44. Bring the probability of a single node successful attack into the required steps of a target node successful attack when the length of the attack chain is θ, the number of steps required for the attacker to successfully attack the target node is:

$$E[S] = \frac{\theta}{[(1-\lambda(T_{E0})) * P(PE) - \lambda(T_{E0})]}$$

Where μ is the probability of the attacker attacking a single node successfully, co is the probability that a single node encounters an active stochastic disturbing, θ is the link length, $\lambda(T_{E0})$ is the frequency at which the stochastic disturbing occurs, and P(PE) is the probability of breaking of a single node.

The disclosure has the beneficial effects that adopting the GSPN model to make the modeling closing to the actual system and ensure the rationality of the model, abstracting the actual situation to ensure the efficiency of the modeling, quantifying the difficulty of the attack to make the different security defense methods can be contrasted. The relationship between different system configuration parameters and security can be found to improve system security. Compared with the existing dynamic heterogeneous redundant network defense effectiveness analysis model method, whether it is actual measurement or mathematical calculation, the most significant advantage of the present disclosure is to design a unified model to quantitatively analysis security for complex defense systems. The analysis is close to the actual system and shows good scalability for the actual system.

The disclosure adopts the layered design, takes into account the mathematical abstraction and the actual system, and reduces the difficulty of mathematical analysis under the premise of ensuring that the model is close to the actual system;

The design of the first layer makes the model flexible and migrating. It can adjust the parameters to achieve the scalability of different system analysis which achieves the purpose of the specific system with specific adjustment parameters and have a guiding role in the actual system parameter configuration. Besides, the present disclosure realizes the quantitative evaluation of security through the design of the second layer, which brings many beneficial effects: the security of different systems is easy to compare. The users can flexibly select the system configuration according to their security requirements. The cyber defense industry can design a safety rating based on the score of a specific system, and divide different security levels for different systems.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

As explained above, to balance the unequal powers afforded to two sides of the security game, different dynamic network architectures have been proposed.

The US Department of Homeland Security proposes a Moving Target Defense (MTD) to handle this situation which is a typical application of dynamic defense and is regarded as a revolutionary technology that changes the ways network security is handled. With different configurations, the corresponding vulnerabilities against attacks are also different. The MTD actively migrates the network configuration to limit the duration of the same vulnerability decreasing the attack surface, which improves the difficulty of attack and reduces the probability of the system being compromised. MTD uses proactively changing the system configuration in exchange for system security improvements, but the performance loss caused by frequent changes of the system configurations cannot be ignored.

In order to avoid frequent reconfiguration, new effective security mechanisms must be found. Under the guidance of Chinese national cybersecurity strategy, Cyberspace Mimic Defense (CMD) adopts the "toxic bacterium" and "beach building" methods to aggregate unsafe components into a reliable system. The mimic defense has two axioms: 1) "Relatively Correct" axiom, that is, "everyone has one or the other shortcomings, but it is rarely for most people make the exactly same mistake independently in the same place at the same time"; 2) "A variety of real-world algorithms often exist under given functional and performance conditions." The equivalent logic expressions of the above two axioms are the heterogeneous redundancy mechanism and the multi-mode voting mechanism. Among them, the Dynamic Heterogeneous Redundancy (DHR) architecture is one of the important principle methods for implementing mimic defense (MD).

Figure 1:
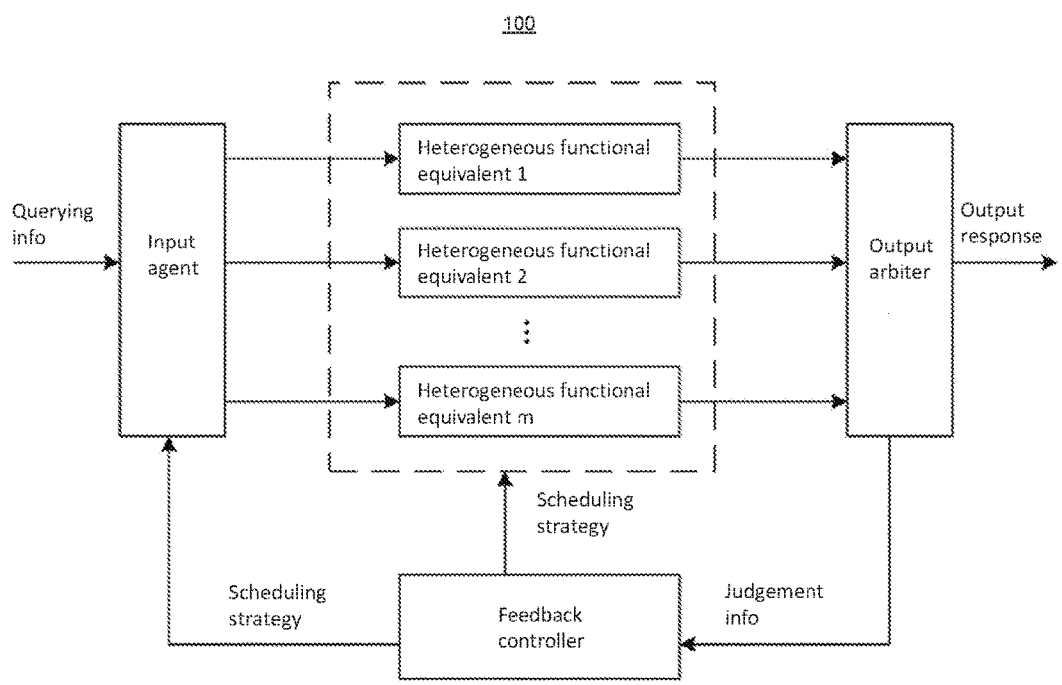
FIG. 1 is a diagram illustrating an example functions and structures of a CMD system, in accordance with some embodiments of the present disclosure.

The CMD aims to establish a relatively secure attack defense system with dynamic, redundant, and heterogeneous features. The present disclosure adopts the classic implementation architecture of mimic defense—Mimic Defense Architecture (MDA) as an example to analyze the security of mimic defense, and then we compose multiple MDA structures as the final mimic defense network. An example structure of MDA is shown in FIG. 1.

The MDA system consists of four types of devices including input agent, heterogeneous domain servers (i.e., executors), feedback controller, and output arbitrator which called the voter as well. Heterogeneous pool are formed by executors who are functionally equivalent can combine various system compositions including the operating system (e.g., Windows, Linux), software and hardware (e.g., Intel, AMD) in module collection. The executors in the heterogeneous pool do not need to be working at the same time. The input agent usually selects three executors to form a set of executors for the current work, and the other executors are used as backups. When the system receives the request message, the input agent issues an instruction to allocate the same function required for the current executor set. Then the task is executed by the working executors. After a certain executing time, the output is sent as a vector result to the output arbitrator. The output arbitrator collects a sufficient number of results and then makes a majority judgment. If the collected output vectors are identical, the multimode voter judges the result as correct to outputs; otherwise, the output arbitrator activates the defense mechanism.

It is worth noting that both MTD and MDA sacrifice some of the performance to meet the security requirements of the system. How to analyze their validity qualitatively and quantitatively has become an urgent task. At present, the analysis work can be divided into two lines, simulating the attack process with experiments to test its correctness and using mathematical tools to model the attack and defense process to calculate its safety indicators, such as the probability of attack successful, mean time to failure (MTTF), and steady-state availability.

The main idea of the security measurement technology based on experimental simulation is to use the simulation platform to simulate the attack process and conduct attack and defense experiments to test the security of the network architecture.

Zhuang et al. (R. Zhuang, S. Zhang, S. DeLoach, X. Ou, and A. Singhal, "Simulation based Approaches to Studying Effectiveness of Moving-Target Network Defense," in Proc. of National Symposium on Moving Target Research, 2012.) provided an MTD system that actively changes the network configuration and compared the effectiveness of a simple stochastic adaptation MTD system and an intelligent attack detection based MTD system.

Hong et al. (Hong J B, Dong S K. "Assessing the Effectiveness of Moving Target Defenses Using Security Models [J]." IEEE Transactions on Dependable & Secure Computing, 2016, 13(2): 163-177.) divided MTD technology into three categories: shuffle, diversity and redundancy. Moreover, they used the Hierarchical Attack Representation Model (HARM) and Importance Measures (IMs) to improve the scalability of the system.

Colbaugh et al. (Colbaugh, Richard, Kristin, "Predictive Moving Target Defense.") built a game model to describe the interaction between attack and defense with a machine learning approach, and analyzed the nature of MTD defense in email applications.

Simulation experiments have certain defects in system security: A. No quantification, difficult to compare: Simulation experiments generally settle on Boolean data such as the success of the attack, so the lack of quantification of the defense system results in that is difficult to compare two different defense structures visually. B. Low scalability: Because the simulation experiment design generally takes a specific system or a specific configuration as an example, the abstraction is low. When the system structure changes, it will have a relatively large impact on the experimental results. It is difficult to simulate by dynamically adjusting a certain parameter. Another common method is estimating the effectiveness of the defense with mathematical methods. In this research, the attack process is usually abstracted and transformed into the probability of attack successful under certain conditions. Usually, some powerful mathematical tools are used for network security analysis, such as Petri net, Markov chain, game theory, stochastic process.

Maleki et al. (Maleki, H., Valizadeh, S., Koch, W., Bestavros, A., & Dijk, M V, Markov Modeling of Moving Target Defense Games. ACM Workshop on Moving Target Defense, pp. 81-92.) introduced an analysis framework based on Markov model, and deduces the relationship between the probability and the time of successfully defeating a system with cost of the defender, and shows how to analyze the multi-level MTD strategy by using single-level MTD.

Mitchell et al. (Mitchell R, Chen I R. Modeling and Analysis of Attacks and Counter Defense Mechanisms for Cyber Phusical Systems [J]. IEEE Transactions on Reliability, 2016, 65(1): 350-358.) divided the network state into five types of components, including central controllers, sensors, executors, distributed management and network connections with three attacking states: attrition, pervasion, and exfiltration. They recorded state transitions with stochastic Petri nets and computed the relationship between the network failure time and various configuration parameters.

Moody et al. (Moody, W C, Hu, H., & Apon, A., Defensive maneuver cyber platform modeling with Stochastic Petri Nets. IEEE International Conference on Collaborative Computing: Networking, Applications and Work sharing pp. 531-538, 2014.) The MTD node status is divided into three categories: operational, idle and deceptive. The stochastic Petri net is used to analyze the corresponding security of the system's state dwell time, and the relationship between state transition frequency and system availability is qualitatively explained.

The main drawback of the existing mathematical model for predicting the security of the defense structure is the low degree of integration with the actual system. In general, mathematical modeling requires a certain abstraction of the actual system to reduce the difficulty of modeling, but on the other hand, the abstraction process also leads to the gap between the model and the actual system. It is difficult to measure the impact of different mathematical abstraction on the authenticity of the modeling results, which reduces the reliability of the modeling scheme.

The existing dynamic heterogeneous redundant network defense security analysis method is generally difficult to achieve a good balance between the fit of the actual system and the ease of modeling, which greatly reduces the reliability of the modeling. Besides, existing mathematical analysis models are difficult to migrate and use in complex network structures. It is difficult to achieve that adjust the model for different network structure with small adjustments. Existing experimental measurement models are difficult to quantify for security and compare different defense structures. Therefore, a well-expanded security model design should meet the following conditions: (1) Fit the actual system, and easy to make flexible adjustment according to the actual situation; (2) The difficulty of mathematical calculation is low, and the system is effectively abstracted; 3) Effectively quantify the difficulty of the attack and facilitate the security comparison between different defense systems; (4) It provides some guidance for designing the actual DHR system with acceptable cost.

In summary, the technical problem to be solved by the present disclosure has four points. (1) Find suitable modeling tools to make the model close to the actual system and ensure the rationality of the model; (2) Abstract the actual situation and ensure the efficiency of the modeling; (3) Quantify the attack difficulty to make different security defense methods comparable; (4) Find the relationship between different system configuration parameters and security, and provide guidance for system design.

The present disclosure abstracts the attack and defense process of the distributed Mimic Defense Architecture (MDA), and divides the attack process of the attacker on a specific node in the network link into two levels according to the attack granularity: a single node attack and a link attack, in which sequential single node attacks on the same attack chain form a network link attack. The present disclosure adopts the idea of the game theory and analyzes the mimic defense model by using mathematical tools such as Generalized Stochastic Petri Net (GSPN), Markov chain and Martingale theory, respectively, from node to link. The present disclosure finally analyzes the security of the whole system, including the success rate of single node attacking, node average attacking time, link attacking time, and so on. The present disclosure firstly considers the security of a single node, which means that analyze the probability of the successful attack a single node within a certain period. Then passes the result to the link attack layer as an input which is the attack strength parameter to calculate the successful link attack probability further.

Single Node Attack

1) Definition

Node: The present disclosure treats an independent functional component in an attack process as a node. A node can be a server, a host, a functional software process, or a functional cluster.

Driving (D): When the voter receives different results, the system marks the few different executors are polluted, evicts and replaces them with innocent executors from the heterogeneous pool. If the attacked executors are the minority rather than the majority, the voter will output the right result. We name this behavior as driving (D).

Mis-driving (M): Similar to the behavior D, the mistakenly evicting accrues, if the attacked executor is more than half. In other words, the most of executors output the same result which means that the attacker is successful. As a result, the voter has an arbitration error. When the system mistakenly evicts the executors, resources in the heterogeneous pool are wasted. It is worth noting that the voter turns aware if the results still cannot reach an agreement after evicted some executors. For example, the first and second executors are attacked, and the results of them are identical, so the third executor is evicted. However, the situation with inconsistent results still exists because of the living tampered executors. The defender will correct the error by the historical record.

Stopping (S): This behavior arises when there are not less than two results and none of which is more than the half. Since lacking reasonable results, the news replaces all the living executors.

Judging (J): When the three executors are executed, the arbitrator will compare the three output vectors received. If they are consistent, the result will be output directly; if the two are consistent and the other is different, then two consistent results are true, and the executor that outputs different result is marked as a suspicious executor and drive is performed.

Different attack and defense behaviors will cause the system to enter different states. The present disclosure defines five system states according to different attack results as follows:

Normal work (A) is that the attacker does not launch an attack or does not have any successful attack so that all the executors are in the normal operation.

Non-specific perception (B) is that when the attacker attacks the system, but the number of attacked executors is too less to confuse the voter. When the results are sent to the voter, the few different executors with wrong results will be discovered and be replaced.

Attrition (C) is when the attacker launch attacks to the most of executors with different tampering result. When the results are sent to the voter, there are no results that are more than half of the total. The voter has no approved result to the output. For example, the first and second executors are attacked, but the result of them are different, and neither of them is as same as the third one. The voter receives three different results, and cannot output result.

Pervasion (D) is that the attacker attacks the most of executors with the same tampering result. When the results are sent to the voter, the tampered results are more than half of the total. The voter outputs tampered results and replace the few innocent executors. For example, the first and second executors are attacked, and the result of them are identical. As a result, the voter outputs this result and marks the third executor as attacked executors.

Exfiltration (E) is when the attacker launches enough powerful attacks in a short time and tampers all the results to the same wrong, the aggressor controls this node with no alarm to the defenders. At this moment the system is in the most critical state because the aggressor can instrument a devastating attack at any time.

2) Generalized Stochastic Petri Net (GSPN) Model Construction

Because the three executors that implement a node function have their vulnerabilities, if the attacker wants to attack the entire node, they must attack the three executors separately. That is to say, the attacker needs to use the vulnerability of each executor to launch the attack in a targeted manner, and finally obtains the control of the executor, which is the desired effect the attacker wants.

On the one hand, defenders can choose different configurations and use mimic defenses to defend. On the other hand, the attacker can detect the configuration information of the work executor, enhance its authority, and further launch more attacks until the control of the executor is obtained. For a single node, the premise of taking control of the node is to overcome most of its executors and control their running results to be consistent to pass multiple arbitrations.

In this step, according to the strength of the attack, the present disclosure divides the single-step attacks suffered by the various executors into general attacks and special attacks. On the one hand, the defender arbitrates the output vector to mark and replace the suspicious executor; on the other hand, in order to prevent high-frequency and high-intensity fast attacks, the defender adopts a low-frequency stochastic disturbing mechanism. Stochastic disturbing refers to selecting an executor to perform offline pre-cleaning or strategic reconfiguration operations by stochastic command and waits to be scheduled to join the current working set after its recovery. Due to the existence of the stochastic disturbing mechanism, even if the standby cooperative attack succeeds, the escapable state cannot be maintained, that is, the attack cannot be maintained.

Attack and defense form a game at this level. Different behaviors of the two sides will have different effects on the output state of a single node. Therefore, the present disclosure uses game theory to describe these effects and establish a generalized stochastic Petri net (GSPN) model. The present disclosure calculates the probability of successful single-node attacking, attacking time and other security assessment parameters.

Usually, a six-tuple is used to represent a generalized stochastic Petri net:

A GSPN=(S, T; F, W, $M_o$, $\lambda$), where

1. S represents the network stage sets (places);

2. T denotes a network transition set and is divided into two subsets: T=Tt∪Ti, Tt∩Ti=$\phi$, Tt={$t_1$, $t_2$, . . . , $t_k$} and Ti={$t_{k+1}$, . . . , $t_n$} represent timed transition sets and immediate transition sets, respectively. The average transition implementation rates which is associated with the timed transitions is $\lambda$={$\lambda_1$, $\lambda_2$ . . . $\lambda_k$}.

3. F denotes the arc of connection between T and S and allows for a suppression arc.

4. W represents the weight corresponding to the arc. When the number of markers in the arc place is more than the weight value, it is a necessary condition for the transition to be implemented.

5. $M_0$ indicates the initial mark position.

Figure 2:
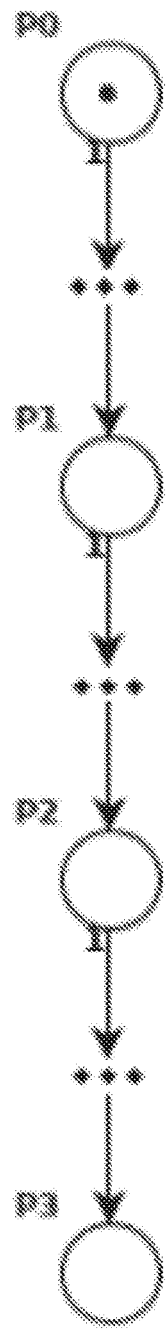
FIG. 2 is a schematic diagram of an attacker's perspective in an attack-and-defense perspective GSPN network, in accordance with some embodiments of the present disclosure.

The disclosure first establishes the GSPN model from the perspective of attackers. As shown in FIG. 2, the attacking party needs to sniff the executor configuration of the node, and specifically breaks through enough executors to obtain the control right of the node. In the attacker's wilderness, a single node system has the following states: normal operation, one executor is broken, two executors are broken, and three executors are broken (in which the attacker can enter the attack process on the next node). By outputting the vector, the attacker can know the result of his attack at the end of the round of attacks. Also, the attacker's model includes the attack on the vulnerability of the executor and brings the privilege escalation, so it is related to the specific configuration of each executor and the target of the attack.

The defensive behavior of the attacker and the defender in the game makes the single node perform the transition between different states through the mimic judgment during the offense and defense process. The states are as follows: normal work; less than half of the executors are broken; more than half of the executors are broken; all executors are broken; after the arbitration, more than half of the executors that have been compromised obtain more than half of the consistent error vectors; after the arbitration, more than half of the executors output different error vectors and none of the error vectors exceeds half; after the arbitration, the error vectors output by all the executors are not more than half; after the judgment, all the executors output the error vector and one of them exceeds half; and, after the arbitration, all the executors are broken, and the identical error vectors are output.

Figure 3:
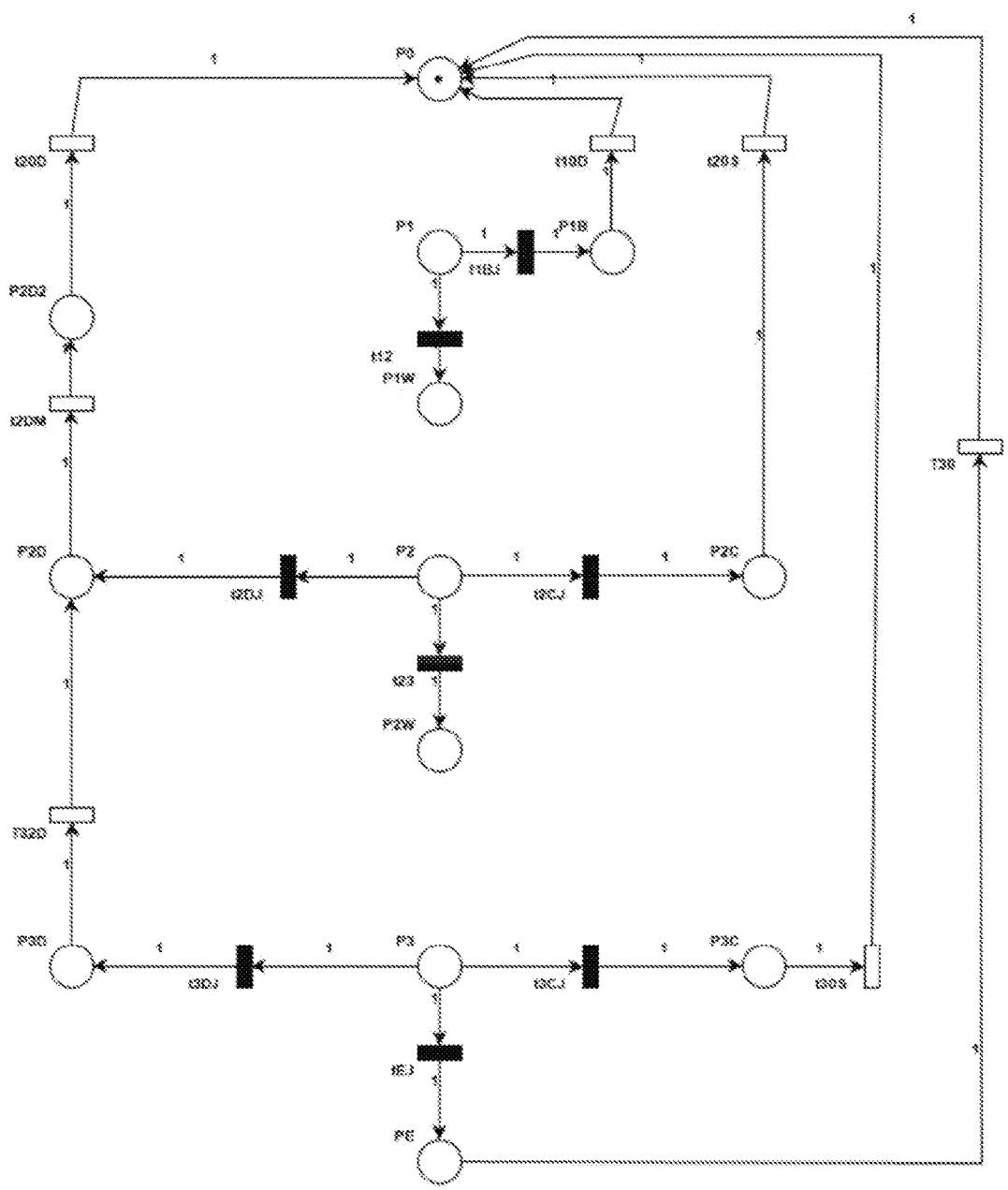
FIG. 3 is a schematic diagram of a defender perspective in a GSPN network of attack and defense perspectives, in accordance with some embodiments of the present disclosure.

In the defensive process, taking the three executors as an example, the defensive party and the single node system have the following states: normal work; one executor has broken; two executors have broken; three executors have broken; after the judgment, two executors that have broken output the same error vector; after the judging, two executors that have broken output different error vectors; after the judgment, the error vectors output by the three executors that have broken are different; after the judgment, the three executors that have broken output two identical error vectors and one different error vector; and three executors output identical three error vectors. The defender completes the transition of the system between different states through a mimic arbitration. The GSPN model of the defensive perspective is shown in FIG. 3.

From the perspective of the attacker and the defender, the present disclosure may obtain the final general attack GSPN network.

The attacker may simultaneously attack the other actors. Since the time required to break each executor is different, the executor which the attacker attacks can be sorted according to the time when the attack is completed. Taking the three executors as an example, there are six arrangements for the attacker's success. Considering the order of completion of the attack, the GSPN network of the attacker and the defensive side is combined to obtain a complete GSPN network schematic. To simplify the analysis, the present disclosure ignores the impact of different attack completion sequences. Assume that the executors 1, 2, and 3 are sequentially broken, and the simplified GSPN network structure diagram is as shown in FIG. 4.

Figure 4:
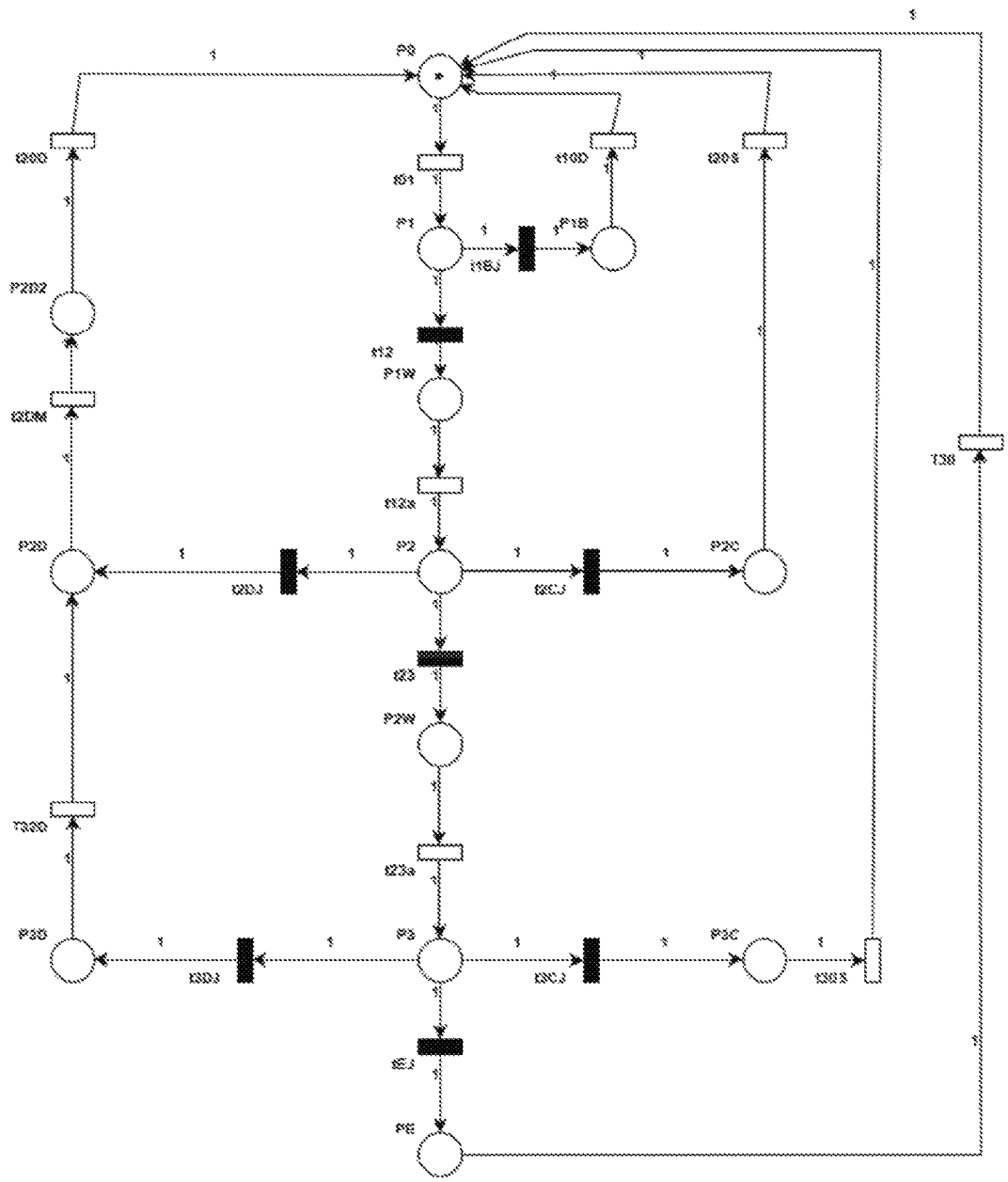
FIG. 4 is a schematic diagram of a simplified attack and defense view GSPN network, in accordance with some embodiments of the present disclosure.

For the Petri net in FIG. 4, the position is represented by a circle denoted as P(i, x), where i is the bits of the compromised executors' number, indicating the number of executors that are broken. Moreover, x is the bit of status, indicating the overall status of the compromised executors. P0 indicates that the system is running normally. P1, P2, and P3 respectively indicate that 1/2/3 executors are successfully attacked. P(i, B) indicates non-specific sensing state, which means that i executors are attacked, but after the majority judgment, the system found all the wrong executors. P(i, C) indicates attrition in which the system is worn out, that is, the i executors are attacked, but the output is completely inconsistent, which results in the system being unable to judge, thus putting all the executors being marked as the attacked executors; P(i, D) indicates the pervasion, that is, after the i executor is attacked, it controls most of the executors to perform the same error output, resulting in misjudgment during the arbitration. The system takes the correct or the minority number of executors that are also attacked but inconsistent in error to be marked as attacked executors; PE indicates the exfiltration in which the attacker controls all the executors and outputs the same error vector, causing the system to fail to find the wrong executor by the majority judging. The specific location meaning is shown in Table 2.2.1.

TABLE 2.2.1.

PLACES IN THE GSPN MODEL

| Location name | Meaning |
| --- | --- |
| $P_0$ | The system is running normally and has not been attacked. |
| $P_1$ | There is one attacked executor which outputs tampered result to the voter and waits for arbitrating. |
| $P_{1W}$ | The other two executors have not outputted the result, so the attacker can launch attack to the second executor. |
| $P_{(1,B)}$ | Result from the attacked executor is arbitrated with the other two as the non-specific perception stage. |
| $P_2$ | There are two attacked executors which outputs tampered results to the voter and waits for arbitrating. |
| $P_{2W}$ | The other executors has not outputted the result, so the attacker can launch attack to the last executor. |
| $P_{(2, D)}$ | Results from the two attacked executor is arbitrated with the other one as the pervasion stage. |
| $P_{(2, D2)}$ | Results from the two attacked executor is arbitrated with the other one as the pervasion stage again. |
| $P_{(2, c)}$ | Results from the two attacked executor is arbitrated with the other one as the attrition stage. |
| $P_3$ | There are three attacked executors that outputs tampered results to the voter and waits for arbitrating. |
| $P_{(3, D)}$ | Results from the three attacked executor are arbitrated as the pervasion stage. |
| $P_{(3, C)}$ | Results from the three attacked executor are arbitrated as the attrition stage. |
| $P_E$ | Results from the three attacked executor are arbitrated as the exfiltration stage. |

The transition table for the defender in FIG. 4 is shown in Table 2.2.2. The transition means the behaviors between attackers and defenders, which leads to a state change. Note the transition as t(i,j,x) that the target translates from the ith executor to the jth executor. If the number of attacked executors changes, i and j are used to distinguish the situation. If the number of attacked executors does not change, the ends of the places are used to distinguish the situation. The element x is the behavioral bit which indicates the behavior is dominating the effort from participants. To be specific, each behaviors (driving, mis-driving, stopping, judging and disturbing) is noted by a transition (t(i,j,D), t(i,j,M), t(i,j,S), t(i,j,J) respectively). For example, t(2,0,S) notes that there are two attacked executors with inconstant tampered results, which leads to three different results. The voter stops all suspicious executors and replaces them with new executors from the pool with heterogeneous executors to work the system again.

TABLE 2.2.2.

TRANSITIONS IN THE GSPN MODEL

| Transition | Behavior description | Direction | General attack parameters | Specific attack parameters |
|---|---|---|---|---|
| $T_{(1, B, J)}$ | Mimic arbitration | When an executor is attacked, it is judged as B state. | 0.4883 | 0.3032 |
| $T_{(1, 2)}$ | The attacker can continue to attack the second executor. | From attacking the first executor to the second executor | 0.5117 | 0.6968 |
| $T_{(1, 2, a)}$ | The attacker continues to attack the second executor | From attacking the first executor to the second executor | 1 | 1 |
| $T_{(B, 0, D)}$ | The mimic system expels the suspicious executor | After the B attack occurs, the system is returned to normal operation by the eviction system. | 1 | 1 |
| $T_{(2, D, J)}$ | Mimic arbitration | Two executors were attacked and judged as D state | 0.0001*0.9093 | 0.0001*0.6988 |
| $T_{(2, C, J)}$ | Mimic arbitration | Two executors were attacked and judged as C state | (1-0.0001)* 0.9093 | (1-0.0001)* 0.6988 |
| $T_{(2, 3)}$ | The attacker can continue to attack the third executor | From attacking the second executor to the third executor | (1-0.9093) | 1-0.6988 |
| $T_{(2, 3, a)}$ | The attacker continues to attack the third executor | From attacking the second executor to the third executor | 1 | 1 |
| $T_{(D, 2, M)}$ | The defender made a false eviction | After the D attack occurs, the defense result is that there are still two executors being attacked. | 1 | 1 |
| $T_{(2, 0, D)}$ | The defender evicted error consistent executors | After the D attack occurs, the defense result returns to the normal state. | ½ | ½ |
| $T_{(2, 0, S)}$ | The defense system disabled the suspicious executor | Return to normal working state by deactivation when two executors are attacked | ⅓ | ⅓ |
| $T_{(3, D, J)}$ | Mimic arbitration | When the three executors are attacked, they are judged as D states. | 3*0.0001* (1-0.0001) | 3*0,0001* (1- 0,0001) |
| $T_{(3, C, J)}$ | Mimic arbitration | The three executors were attacked and sentenced to state C. | (1-0.0001)* (1-2*0.0001) | (1-0,0001)* (1-2*0,0001) |
| $T_{(E, J)}$ | Mimic arbitration | Judging is state E | 0.0001*0.0001 | 0.0001*0.0001 |
| $T_{(3, 2, D)}$ | Defender took the expulsion | When the three executors are attacked, the system migrates to the two executors being attacked. | 1 | 1 |
| $T_{(3, 2, S)}$ | The defender disabled the suspicious executor | The three executors are attacked, and the defensive behavior returns to the two executors being attacked. | ⅓ | ⅓ |
| $T_{(3, 0)}$ | Stochastic disturbing | Escape from attack and return to normal working condition. | 0.0001 | 0.0001 |

For the timed transition, we assume a negative correlation between the delay of transition and the number of the involved executors. For example, we take the delay as 1 (i.e., $\lambda = 1$) for the behavior driving out and behavior mistakenly evicting, which influence the only single executor. We take the delay as n (i.e., $\lambda = 1 = n$) for the behavior stops which influences n executors. Besides, we take the probability of crushing any two executors with the same wrong is 0:0001.

While the attacker is attacking the executors, other working executors calculate the correct output vector in normal operation. The longer the attacker's attack time, the higher the probability that other executors output the correct output vector. As a result, the arbitrator collects more the correct output vectors, the higher the probability of collecting enough output vectors for a mimic arbitration. As the attack progresses, the number of successfully attacked executors is also positively correlated with the attack time.

For a working executor, if the task working time is $t_w$, the number of result outputs of each executor is subject to the Poisson distribution during the period from the receipt of the task. The process is stopped after the result is outputted. It is easy to know the parameter $\lambda = 1/t_w$. N(t) is the number of times the executor result output executed from the start of the task distribution (stops after outputting the result). The complexity of different types of attack operations is different. The triggering speed of Trojan attacks and injection attacks is similar to the normal operation executor time. Therefore, it is assumed that the time to attack an executor is 0.8 $t_w$~1.2 $t_w$.

The attacking ability of a general attack is weak, and there is no additive effect. The present disclosure takes 1.2 tw. For a general attack, after the attacker has captured an executor, the probability that the normal working executor has completed the output is:

$$P_{1w} = P\{N(1.2t_w) - N(0) > 0\} = 1 - e^{-1.2tw*\frac{1}{tw}\frac{(\lambda t)^0}{0!}} \qquad (1)$$
$$= 1 - e^{-1.2}$$
$$\approx 0.6988$$

Therefore, after the general attack is completed, the other two normal working executors have completed the output of the result, that is, the probability that the system performs the mimic judging ($t_{(1, B, J)}$) is:

$$P_{1M}{}^J = P_{1M}*P_{1M} \approx 0.4883 \qquad (2)$$

Similarly, after the attack completes two executors (time 2.4 $t_w$), another normal working executor has finished outputting the result, which is:

$$P_{2M}^J = P\{N(2.4t_w) - N(0) > 0\} \qquad (3)$$
$$= 1 - e^{-2.4tw*\frac{1}{tw}\frac{(\lambda t)^0}{0!}}$$
$$= 1 - e^{-2.4}$$
$$\approx 0.9093$$

The probability that the system carries out the mimic judging ($t_{(2, C, J)} + t_{(2, D, J)}$) is 0.9093.

The attacking ability of a special attack is strong and has an additive effect. When the same vulnerability is encountered, the attack speed will be accelerated, so the attacker is in the process of attack, an executor that has not been attacked outputs the correct result, causing it to experience a mimic arbitration with a lower probability than a general attack. Suppose the attacker is attacking the second executor with speed doubled, the time for the special attack to break the first and second executors is 0.8 $t_w$ and 1.2 $t_w$, respectively. For a special attack, after the attacker conquers an executor, the probability that the normal working executor has completed the output is:

$$P_{1W}^S P = N(0.8t_w) - N(0) > 0 \qquad (4)$$
$$= 1 - e^{-0.8tw*\frac{1}{tw}\frac{(\lambda t)^0}{0!}}$$
$$= 1 - e^{-0.8}$$
$$\approx 0.55067$$

Therefore, after a special attack is completed, the other two normal working entities have completed the output of the result, that is, the probability that the system performs the mimic judging (t(1, B, J)) is:

$$P_{1M}{}^{JS} = P_{1M}{}^S * P_{1M}{}^S \approx 0.3032 \qquad (5)$$

Similarly, after a special attack completes two executors (time 1.2 tw), another normal working executor has finished outputting the result, which is:

$$P_{2M}^{JS} P = N(1.2t_w) - N(0) > 0 = 1 - e^{-1.2tw*\frac{1}{tw}\frac{(\lambda t)^0}{0!}} \qquad (6)$$

The probability that the system carries out the mimic arbitration (t(1, C, J)+t(2, D, J)) is: $=1-e^{-1.2}\approx 0.6988$ $\lambda$ is the rate of the Poisson process, $\lambda>0$;

Combined with the judgment probability of various situations, the parameters in Table 2.2.2 may be completed.

After the complete GSPN model is established, the present disclosure may set the parameters of each transition, thereby estimating the success rate of the final single node attack.

Link Attack

A complete network link consists of many nodes. Therefore, if one wants to attack a node in the link, the attacker needs to attack each node on the link in turn. The present disclosure takes the steady state time of a single node as the attack period of the system. The attacker advances along the attack chain. Each attack succeeds one node, and the attacker goes down one step along the attack chain. If it encounters a mimic stochastic disturbing, it will take a step back along the attack chain. This kind of knowing the state of the previous step, and the scope of the next attack, looking for the location of the attack, is consistent with the characteristics of the Markov chain. Therefore, it is proposed to use the Markov chain and Martingale theory to solve this part of the model.

Figure 5:
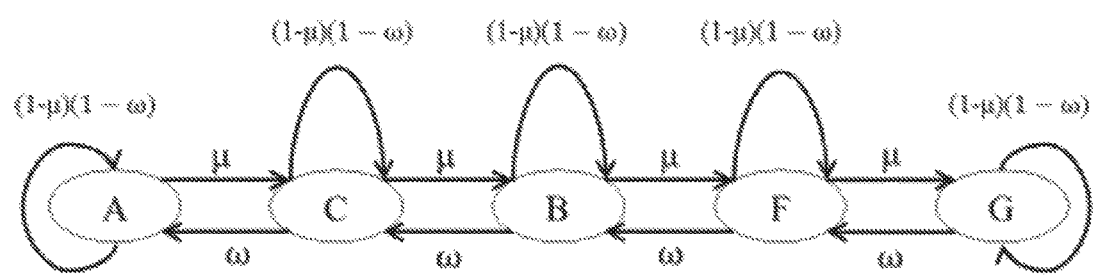
FIG. 5 is an attack transition diagram, in accordance with some embodiments of the present disclosure.
Figure 6:
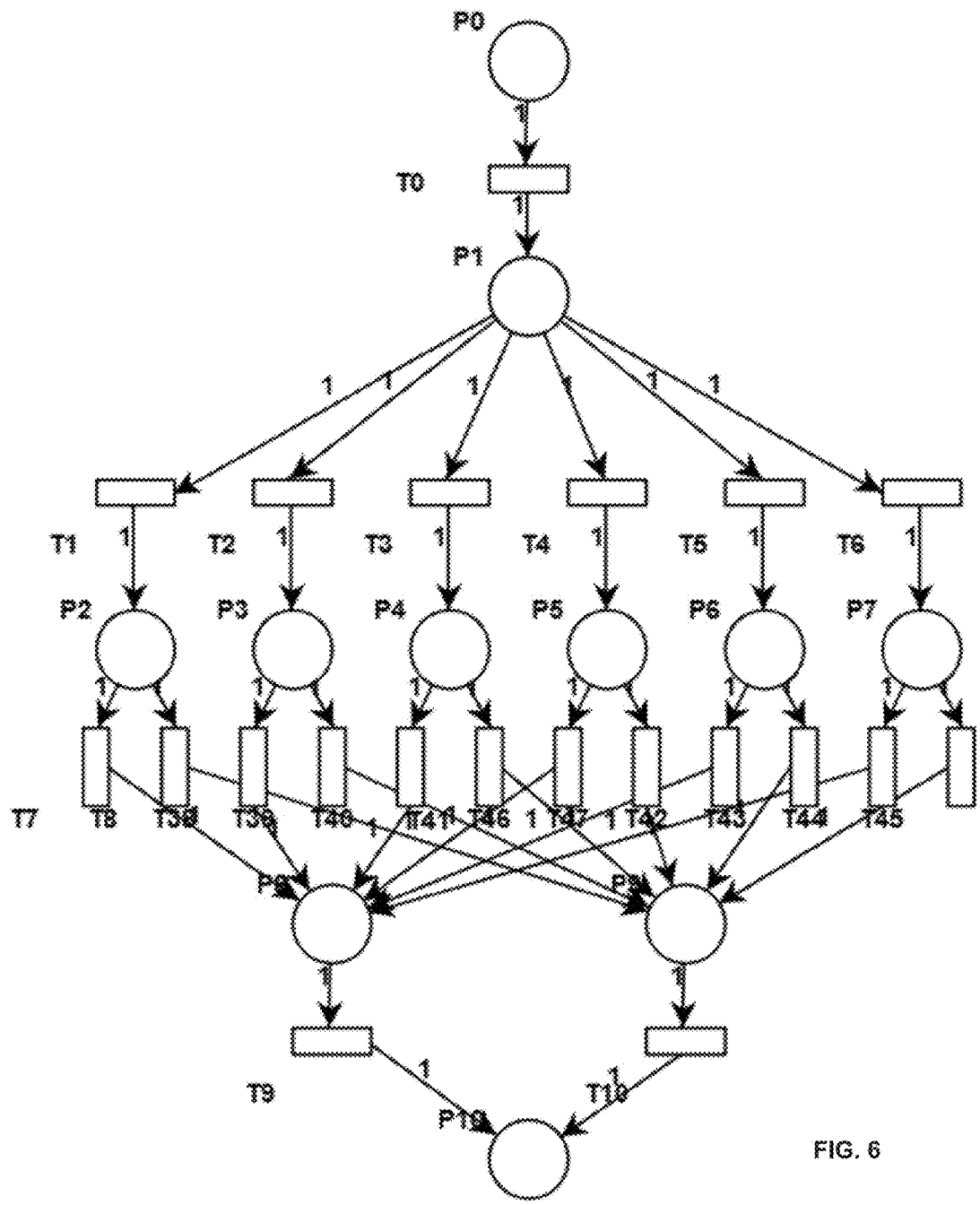
FIG. 6 is a vulnerability detail of an attacker attack executor 1, in accordance with some embodiments of the present disclosure.
Figure 7:
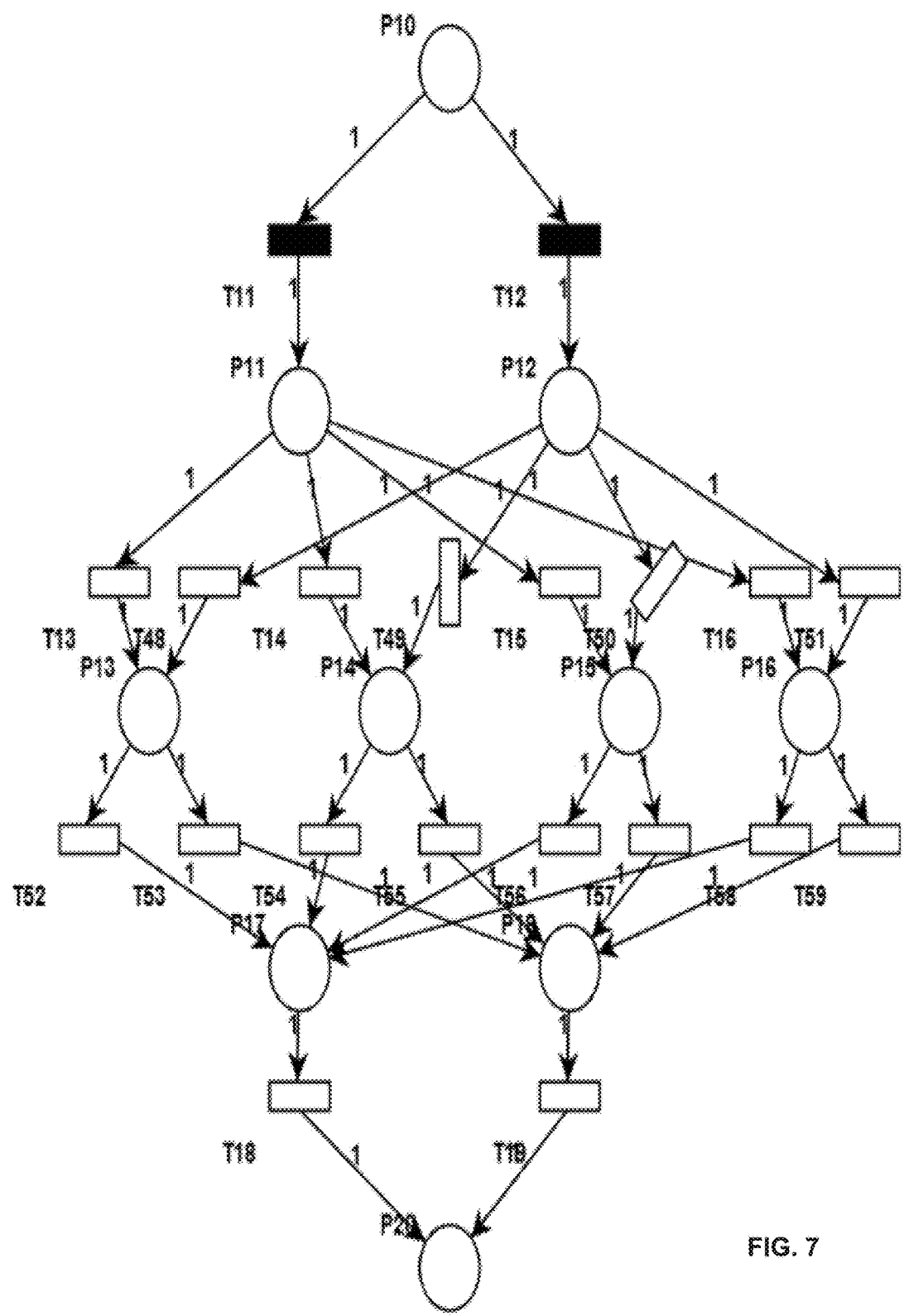
FIG. 7 is a vulnerability detail of an attacker attack executor 2, in accordance with some embodiments of the present disclosure.
Figure 8:
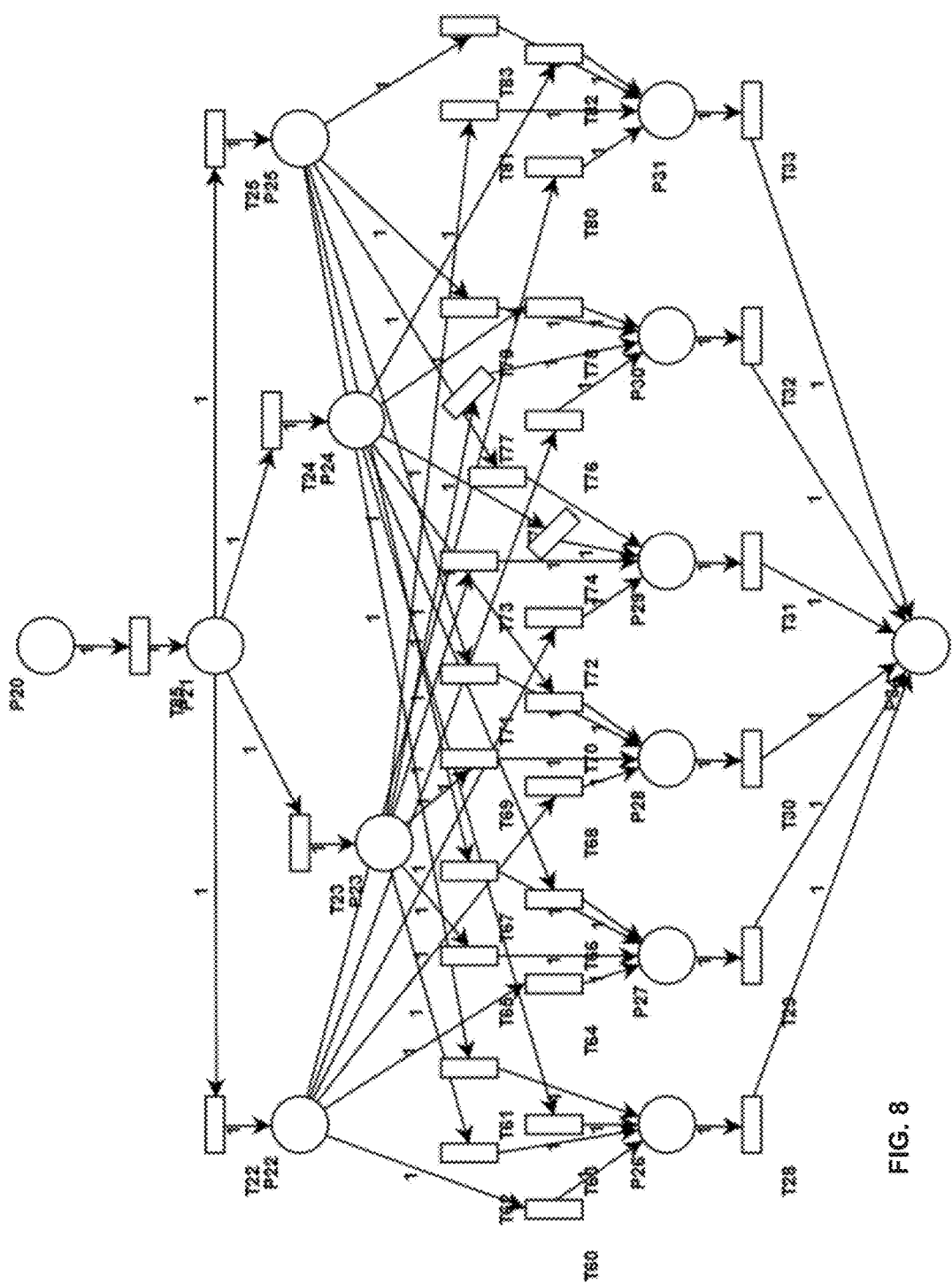
FIG. 8 is a vulnerability detail of an attacker attack executor 3, in accordance with some embodiments of the present disclosure.

The probability that the attack on a single node succeeds is $\mu$, the total number of nodes in the attack chain is $\theta$, and the probability that the system selects the node for stochastic disturbing at this time is $\omega$. Assuming that the attacker stays at the k-th node at the current moment, that is, the k nodes have been successfully attacked, then the attack transition graph is as shown in FIG. 5.

We represent the attacker transfer by a $M_{\theta+\theta}$, matrix where the W columns (and rows) denote the $\theta$ nodes in the attack chain. The cell $M_{i,j}$ denotes the transfer probability from the ith node to the jth node. Represent the attackers' successful state by $\theta$ (in the example shown by FIG. 5 is G). Moreover, the state 0; 1, ..., $\theta$−1, correspond to the different position the attack at after the last period. Attackers launch the attack to the node one by one along the attack chain. The attack has three possible moving directions after mimic disturbing: going to the next node, going back to the last node, or staying at the same node. Correspondingly, the transforming probability is shown as follows:

1) Back-Off

Regardless of whether the attacker launches an attack, as long as the system changes to the node where the attacker is located or the target node that is attacking when the system performs stochastic disturbing, the attack will not be possible, and the attacker must fall back to the previous node that has been attacked, that is, $M_{i,i-1}=\omega_o$. The attacker needs to attack the $i_{th}$ point single-node attack again, and only then can attack the $i_{th}$ point before the next stochastic disturbing.

2) Move-Forward

The probability that the attacker attacks the next node successfully is $\mu$. The probability that the system does not stochastically perturb the attack-related node during the transformation period is (1−$\omega$). Therefore, the probability that the attacker successfully attacks the next node without stochastic disturbing during the period is $M_{i,i+1}=(1-\omega)\mu$.

3) Stand-Still

The attacker attacked the next node unsuccessfully, and the system did not stochastically perturb the relevant nodes. At this time, the state of the system remains unchanged, with $M_{i,i}=(1-\omega)(1-\mu)$.

Let $X_0, X_1, X_2, \ldots, X_n$ denote a string of stochastic variables, and $X_1$ denote the position of the node where the attacker is at the beginning of the $i_{th}$ period. Every element has a value range of $[0, \theta]$, where $X_0=0$ indicating that the initial position of the attack is the position of entering the attack chain. When the state at time n is known, the state at next period is inferred as follows:

$$P\{X_{n+1}=k+1|X_n=k\}=(1-\omega)\mu \quad (7)$$

$$P\{X_{n+1}=k|X_n=k\}=(1-\omega)(1-\mu) \quad (8)$$

$$P\{X_{n+1}=k-1|X_n=k\}=\omega) \quad (9)$$

Hence, $$E[X_{n+1}|X_n]=(1-\omega)\mu(k+1)+(1-\omega)(1-\mu)k+\omega(k-1)$$

$$=k+(1-\omega)\mu-\omega \quad (10)$$

Theorem 2.2.1. Construct a stochastic sequence $M_0, M_1, M_2, \ldots, M_n$, where $$M_n=X_n-[(1-\omega)\mu-\omega] \quad (11)$$

$$M_{n+1}=X_{n+1}-[(1-\omega)\mu-\omega)]*(n+1) \quad (12)$$

Then the sequence $M_n$ is a martingale with respect to $X_0, X_1, X_2, \ldots X_n$.

Prove:

$$E[M_{n+1}|X_0,X_1,X2,\ldots,X_n]=E[M_{n+1}|X_n]$$

$$=E[X_{n+1}-[(1-\omega)\mu-\omega]*(n+1)|X_n]$$

$$=E[X_{n+1}|X_n]-[(1-\omega)\mu-\omega]*(n+1)$$

$$=X_n+(1-\omega)\mu-\omega[1-\omega)\mu-\omega]*(n+1)$$

$$=X_n-[1-\omega)\mu-\omega]*(n)$$

$$=M_n \quad (13)$$

Certificated.

In order to solve the number of steps of the attack θ reaching the target node, the present disclosure introduces a Martingale stopping-time theorem (i.e., Lemma 2.2.1). In a stochastic process, stopping time is defined as a stochastic moment with some nature unrelated to the future.

Lemma 2.2.1. If time S is stopping time, and satisfies:

$$P\{S<\infty\}=1; \quad \text{i.}$$

$$E[|Ms|]<\infty; \quad \text{ii.}$$

$$\lim_{n\to\infty}E[|Ms|I_{(S>n)}]=0; \quad \text{iii.}$$

Then there is $$E[M_s]=E[M_0] \quad (14)$$

Theorem 2.2.2. For a CMD game with the probability μ attacking a single node successfully and probability ω performing mimic disturbing at this node. And there are θ nodes in the attack chain. The expected time until the attackers win the game (i.e., attacking the $\theta_{th}$ node successfully) is:

$$E[S] = \frac{\theta}{[(1-\omega)\mu - \omega]} \quad (15)$$

Proof: As can be seen from the foregoing, the condition of arrival time S is Xs=θ. Based on the results of the previous n rounds, it can be obtained whether n is equal to S, so it is easy to know that time S is the stop time of Martingale. However, Mn is not a bounded enthalpy, and it cannot be immediately stated that condition ii, iii holds, but according to the nature of the Markov chain, there exist C<∞, ρ<1, s.t.

$$I\{S>n\}\leq c\rho^n \quad (16)$$

Notice that $$|M_n|=|X_n-[(1-\omega)\mu-\omega]*n|+n \quad (17)$$

And thus $$E[|M_s|]\leq \theta+S\leq \infty \quad (18)$$

$$E[|M_s|I_{(S>n)}]\leq c\rho^n(\theta+n) \quad (19)$$

$$\lim_{n\to\infty}E[|M_s|I_{(S>n)}]\leq \lim_{n\to\infty}c\rho^n(\theta+n)=0 \quad (20)$$

Since $E[M_s|I(S>n)]>=0$, the stopping time theorem is satisfied.

The number of steps to reach point S is calculated below. According to the stopping time theorem, got:

$$E[M_s]=E[M_0]=E[X_0]=0 \quad (21)$$

$$E[M_s]=E[X_s-[1-\omega)\mu-\omega]S] \quad (22)$$

$$=E[Xs]-[(1-\omega)\mu-\omega]E[S]$$

$$=0$$

Moreover, because of $E[Xs]=\theta$, $$\Theta-[(1-\omega)\mu-\omega]*E[S]=0 \quad (23)$$

$$E[S] = \frac{\theta}{[(1-\omega)\mu - \omega]} \quad (24)$$

According to the analysis of the previous part, the steady-state probability of the exfiltration is the downlink probability of the Markov chain in the second part. And the stochastic disturbing probability is the uplink probability of the Markov chain, that is:

$$\mu=P(P_E), \omega=\kappa(T_{E0})$$

If there is no stochastic disturbing, $\omega=\lambda(T_{E0})=0$.

Therefore, according to the results of the previous part of the experiment, when the attack chain length is θ, the number of steps required for the attacker to successfully attack the target node is:

$$E[S] = \frac{\theta}{[(1-\lambda(T_{E0})*P(PE) - \lambda(T_{E0})]} \quad (25)$$

System Analysis

In the next two sections, the present disclosure takes an actual attack chain as an example, including each node in the attack and the executor composition of each node.

Assume that the attack enters from the external network. The attack target is to steal files from each node database in a link and insert the backdoor. There are 10 link nodes, that is, S=10. For each link node, the attacker attacks the node's operating system, server, and database separately until the data is stolen and the backdoor is successfully placed.

The executor uses the operating system "front-end language" database as an example. The attacker determines the order of the attack executor based on the scanned information. The defender selects the replacement executor according to the information of the invalid executor, and a game is formed between the two. The disclosure is described with a generalized stochastic Petri network. The disclosure uses a critical database when designing the delay function: Common Vulnerability Scoring System (CVSS). CVSS is an "industry open standard" designed to measure the severity of vulnerabilities and help determine the urgency and importance of the desired response, generally in conjunction with Common Vulnerabilities & Exposures (CVE) by the US National Vulnerability Database (NVD). The goal is to provide a severity rating for all software security vulnerabilities, establish criteria for measuring the severity of vulnerabilities, and compare the severity of vulnerabilities to each other to determine their priority.

The CVSS score is based on measurements in a series of dimensions called Metrics. The final score for the vulnerability is a maximum of 10 and a minimum of 0. The CVSS system includes three types of scores: benchmark scores, temporal scores, and environmental scores. Each score measures the different attributes of this vulnerability. The benchmark score specifically refers to a specified security vulnerability, and the benchmark score is constant. It is not specific to a customer's technical IT environment. Security product vendors and vendors usually give benchmark scores and temporal scores because they have a clearer understanding of the details of the vulnerability; users usually give environmental scores because they are better able to evaluate the potential impact of this vulnerability in their environment.

There are several measures in the benchmark score: Access Vector (AC)>Access Complexity (AC), Privileges Required (PR), User Interaction (UI), Scope (S), Confidentiality Impact (C), Integrity Impact (I), and Availability Impact (A). Based on these, two core evaluation values can be calculated: Exploitability sub-score (ES) and Impact sub-score (ISC), where the ES measures the difficulty of the vulnerability being discovered, and the ISC means the impact of the exploited vulnerability. The final calculation score for the vulnerability score Base Score (BS) is as follows:

$$ES=8.22 \times AC \times AC \times PR \times UI$$

$$ISC=6.42 \times 1-[(1-\text{Impact Conf}) \times (1-\text{ImpactInteg}) \times (1-\text{Impact Avail})]$$

$$BS=\text{Roundup}(\text{Minimum}[(ISC+ES),10]) \cdot \text{Specific calculation can refer to(specified resources)} \cdot$$

The present disclosure now describes a mimic node having three levels of heterogeneity, C1*C2*C3={{RedhatLinux6.0, Windows7}*{Go 1.6, Python 3.0}*{MySQL 5.1.7, PostgreSQL 9.6}}. This node is heterogeneous in the operating system, language, and database. The operating system is selected between RedhatLinux 6.0 (from now on referred to as Linux) and Windows 7, and the language is between Go 1.6 and Python 3.0. Select, the database is chosen between MySQL 5.1.7, PostgreSQL 9.6. So the effective configuration in the entire heterogeneous pool can be expressed as C={(Linux, Go, MySQL), (Linux, Go, PostgreSQL), (Linux, Python, MySQL), (Linux, Python, PostgreSQL), (Windows 7, Go, MySQL), (Windows 7, Go, PostgreSQL), (Windows 7, Python, MySQL), (Windows 7, Python, PostgreSQL)}, a total of 8 effective configurations.

For the operating system, the present disclosure only considers serious vulnerabilities from adjacent networks that do not require authorization and no user interaction, of which there are 2 Windows 7 and 1 Linux. For programming languages and databases, the present disclosure considers vulnerabilities from the network that do not require authorization and do not require interaction with other components. There are 4 for Python 3.0, 6 for Go 1.6, 6 for PostgreSQL 9.6, and 2 for MySQL 5.1.7, as shown in Table 4.

TABLE 4

Vulnerability List

| ID | CVEID | BS | ISC | ES |
|---|---|---|---|---|
| W7-1 | CVE-2017-8628 | 6.8 | 5.2 | 1.6 |
| W7-2 | CVE-2018-1004 | 6.5 | 3.6 | 2.8 |
| Linux | CVE-2017- | 7.4 | 4.0 | 2.8 |
| Python-1 | CVE-2016-5636 | 9.8 | 5.9 | 3.9 |
| Python-2 | CVE-2016-1494 | 5.3 | 1.4 | 3.9 |
| Python-3 | CVE-2013-7440 | 5.9 | 3.6 | 2.2 |
| Python-4 | CVE-2016-0772 | 6.5 | 4.2 | 2.2 |
| Go-1 | CVE-2018-6574 | 9.8 | 5.9 | 3.9 |
| Go-2 | CVE-2017-15042 | 5.9 | 3.6 | 2.2 |
| Go-3 | CVE-2017-15041 | 9.8 | 5.9 | 3.9 |
| Go-4 | CVE-2017-8932 | 5.9 | 3.6 | 2.2 |
| Go-5 | CVE-2016-5386 | 8.1 | 5.9 | 2.2 |
| Go-6 | CVE-2016-3959 | 7.5 | 3.6 | 3.9 |
| MySQL-1 | CVE-2017-15945 | 7.8 | 5.9 | 1.8 |
| MySQL-2 | CVE-2013-0375 | 6.4 | 2.7 | 3.1 |
| postgreSQL-1 | CVE-2017-7546 | 9.8 | 5.9 | 3.9 |
| postgreSQL-2 | CVE-2017-7486 | 7.5 | 3.6 | 3.9 |
| postgreSQL-3 | CVE-2017-7485 | 5.9 | 3.6 | 2.2 |
| postgreSQL-4 | CVE-2017-7484 | 7.5 | 3.6 | 3.9 |
| postgreSQL-5 | CVE-2018-1H5 | 9.1 | 5.2 | 3.9 |
| postgreSQL-6 | CVE-2017-7548 | 7.5 | 3.6 | 3.9 |

Because the structural difference between the executors is more significant, the whole system is safer, so the present disclosure selects the isomer configuration from the heterogeneous pool as follows: {(Linux, Go, MySQL), (Windows 7, Python, MySQL), (Linux, Python, PostgreSQL)}, to the first executor as an example, the vulnerability is shown in Table 5.

TABLE 5

Executor 1 Vulnerability List

| ID | CVEID | BS | ISC | ES |
|---|---|---|---|---|
| Linux | CVE-2017- | 7.4 | 4.0 | 2.8 |
| Go-1 | CVE-2018-6574 | 9.8 | 5.9 | 3.9 |
| Go-2 | CVE-2017-15042 | 5.9 | 3.6 | 2.2 |
| Go-3 | CVE-2017-15041 | 9.8 | 5.9 | 3.9 |
| Go-4 | CVE-2017-8932 | 5.9 | 3.6 | 2.2 |
| Go-5 | CVE-2016-5386 | 8.1 | 5.9 | 2.2 |
| Go-6 | CVE-2016-3959 | 7.5 | 3.6 | 3.9 |
| MySQL-1 | CVE-2017-15945 | 7.8 | 5.9 | 1.8 |
| MySQL-2 | CVE-2013-0375 | 6.4 | 2.7 | 3.1 |

Figure 9:
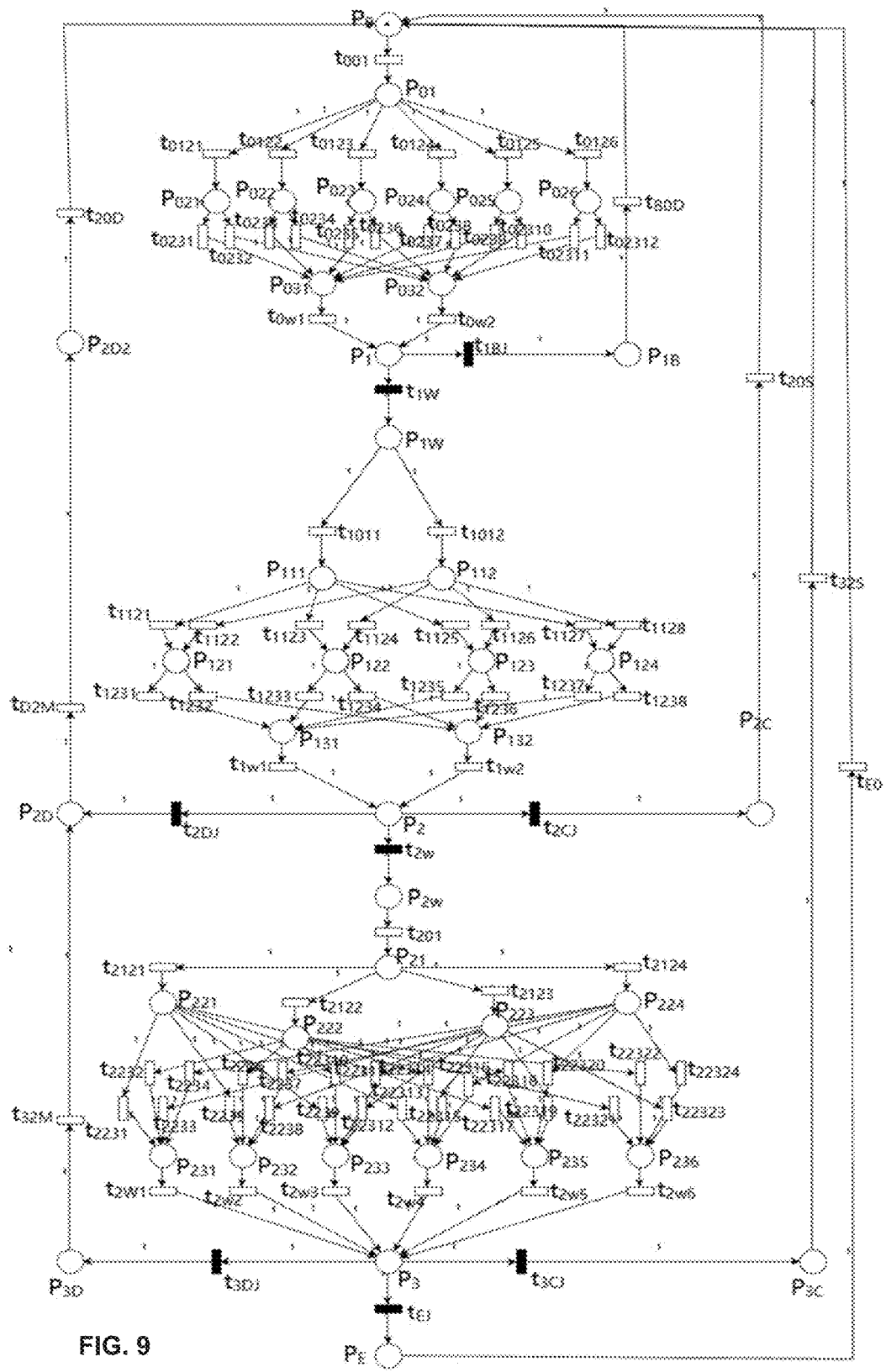
FIG. 9 is a schematic diagram of a mimic node attack and defense GSPN network, in accordance with some embodiments of the present disclosure.

In the attacker's perspective, when the three executors are attacked separately, the attack process is as shown in FIG. 5. Therefore, according to the above, the impact of different attack sequences is ignored, and the attack completion sequence is the executor 1, the executor 2, and executor 3, the present disclosure obtains the attack and defense GSPN network of the entire mimic node, as shown in FIG. 9.

The generalized stochastic Petri network defender may flexibly design the delay function according to his security requirements. For example, if the defender pays more attention to the influence of the vulnerability, the delay can be set to 1/ISC; if the defender wants to consider the exploitability and impact at the same time, the, and the delay function can be designed to be 1/BS. It is also possible to add environmental and time effects according to requirements and flexibly modify.

The third section mentions that attacks can be classified into general attacks and special attacks depending on the strength of the attack. For a general attack, since the attacker's attack at time T has no synergistic effect on the attack at time T+X, the transition delay of the present disclosure is only inversely proportional to the attack difficulty ES, and has nothing to do with the attack phase. Here the experimental transition parameter $\lambda=1/ES$. For a special attack, because the attacker's attack at T time has a synergistic cumulative effect on the attack at T+X time, the attacker will learn the previous experience when attacking the same vulnerability, resulting in faster attack speed and successful attack. The rate increases, the disclosure sets the first time the vulnerability experiment rate is $\lambda_1=1/ES$, and each time the vulnerability is encountered, the attack speed of the attack is doubled (the error is undefined bookmark), i.e., $\lambda_2=2/ES$, $\lambda_3=4/ES$.

In the following, different attack strengths will be classified and discussed.

For the system location and transition table, see Table 1 and Table 2 above. For the complete table, see Appendix Table 1, Appendix Table 2, respectively. The difference between a general attack and a special attack is mainly reflected in the attack process and the attack speed and the exfiltration probability of the stochastic disturbing frequency against the general attack and the special attack, and the time when the system reaches the stability. The impact is finally selected by different attack scenarios to give suggestions for countermeasures under daily defense and attack scenarios.

Attack Time Impact

Figure 10:
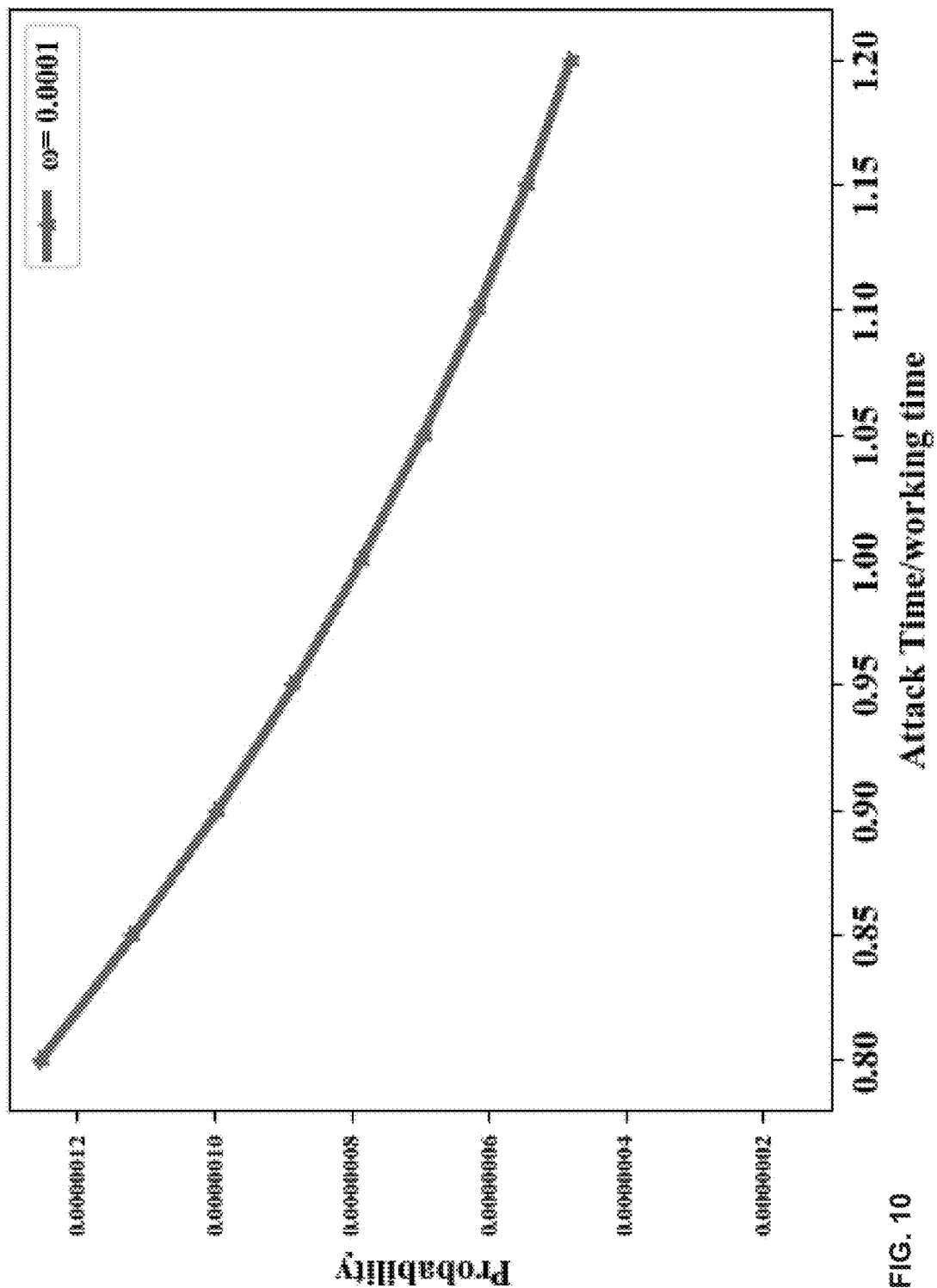
FIG. 10 is a diagram corresponding to attack speed and exfiltration probability, in accordance with some embodiments of the present disclosure.

The present disclosure takes the stochastic disturbing frequency $\omega=0.0001$, and the attack time of the previous hypothesis condition is between $0.8\ t_w \sim 1.2\ t_w$ every $0.05\ t_w$, and the corresponding attack success rate is transformed, as shown in FIG. 10.

According to FIG. 10, the attack success rate decreases with the decline of the attack speed, but the decline is not large, that is to say, the attack speed and the learning ability of the attack increase, and the exfiltration probability increases, but the subtle on the same magnitude change without a change in the overall security level. This also shows that the enhancement of system security is brought about by the structure of the mimic system, and the subtle gaps brought by the previous assumptions are negligible.

The Effect of Stochastic Disturbing Frequency on General Attacks and Special Attacks Considers that as long as no exfiltration, the defender can find the attack behavior, and the attacker cannot sneak in the system without any sound, so it may change the stochastic disturbing frequency and explore the system security. The relationship between the frequency and the frequency of the transformation, so that the defender can flexibly select parameters according to the different requirements of security and system performance. The corresponding correspondences are shown in Table 6.

TABLE 6

Correspondence table between stochastic disturbing frequency and exfiltration probability

| Stochastic disturbing frequency ω | Exfiltration probability in general attack P($P_E$) | Exfiltration probability in specific attack P'($P_E$) |
|---|---|---|
| 0.00000001 | 0.004786478 | 0.01829249548 |
| 0.0000001 | 0.000480719 | 0.0018598690 |
| 0.0000005 | 0.000096180727178 | 0.0003725281 |
| 0.000001 | 0.00004809267638 | 0.00018629875 |
| 0.000005 | 0.0000096189056 | 0.00003726530 |
| 0.00001 | 0.000004809475809 | 0.000018633 |
| 0.00005 | 0.000000961898863 | 0.00000372666 |
| 0.0001 | 4.8094966269e-007 | 0.00000186333 |
| 0.0005 | 0.00000009618997 | 0.00000037267 |
| 0.001 | 4.8094987087e-008 | 0.00000018633 |
| 0.005 | 9.6189977875e-009 | 0.00000003727 |
| 0.01 | 4.8094989169e-009 | 0.00000001863 |
| 0.05 | 9.6189978708e-010 | 0.0000000037 |
| 0.1 | 4.8094989377e-010 | 0.00000000186 |
| 0.5 | 9.618997879e-0H | 0.0000000003727 | probability of encountering the output of the system result. That is to say, the influence of the general attack and the special attack on the GSPN model is different from the setting of the structure and parameters. The comparison is given in Appendix Table 2.

Experimental Simulation and Result Analysis

The proposed model is formulated with the Platform Independent Petri Net Editor (PIPE) combined the Stochastic Petri Net Package.

Figure 11:
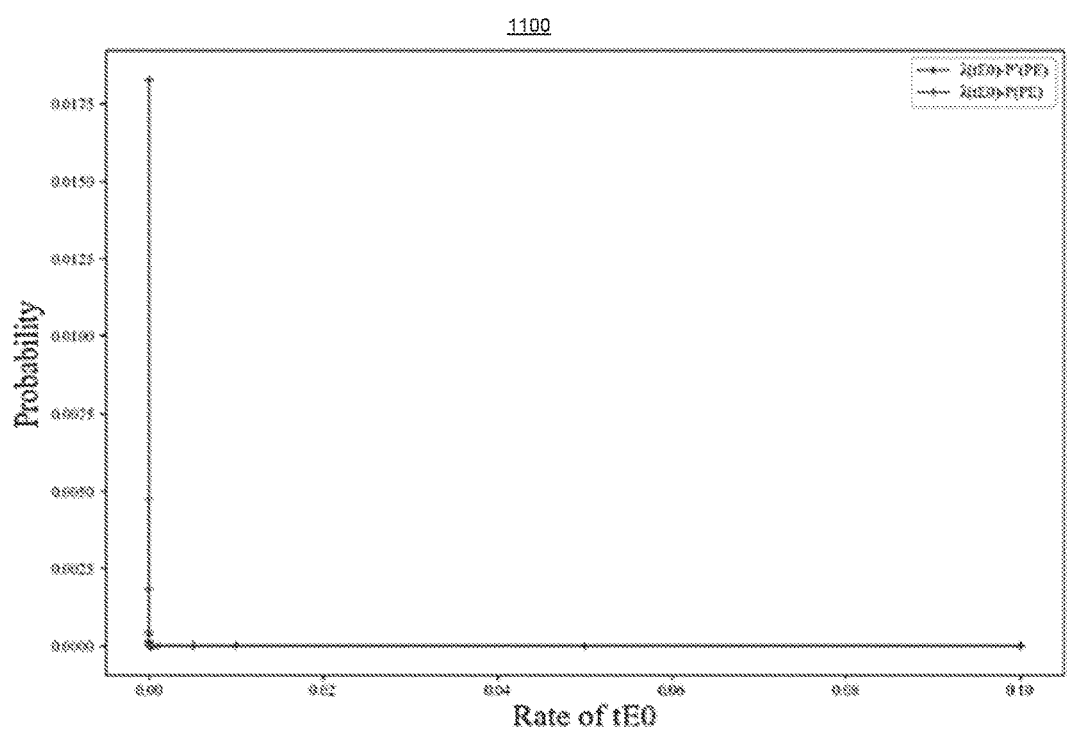
FIG. 11 is a general diagram of a correspondence diagram between a stochastic disturbing rate and an exfiltration probability, in accordance with some embodiments of the present disclosure.
Figure 12:
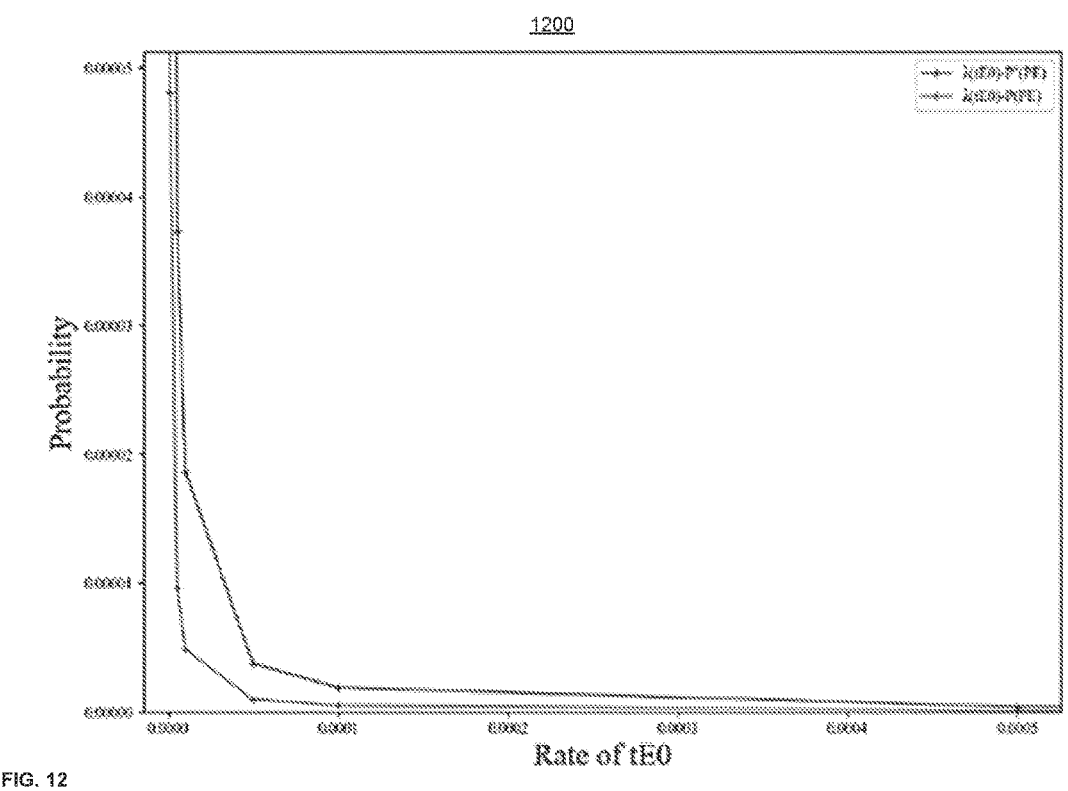
FIG. 12 is a partial enlarged view of a stochastic disturbing frequency and an exfiltration probability, in accordance with some embodiments of the present disclosure.

In the next section, it first takes the general attack as an example to explore the impact of the pre-conditional hypothesis on the security of the mimic defense, and then explore The transformation curve is shown in FIGS. 11 and 12. The red line indicates a special attack, and the green line indicates a general attack. Because the conversion frequency is minimal and the selection point is dense, the corner of FIG. 11 is very sharp, and the corner is partially enlarged to obtain FIG. 12.

Observing FIGS. 11 and 12 for the same stochastic disturbing frequency, the special attack is stronger because of the learning ability, the attack power is stronger, and the attack speed is faster, so the exfiltration probability is higher than the general attack. In general, regardless of the general attack or the special attack, the exfiltration probability decreases as the stochastic disturbing frequency increases.

Influence of Stochastic Disturbing Frequency on System Settling Time

Figure 13:
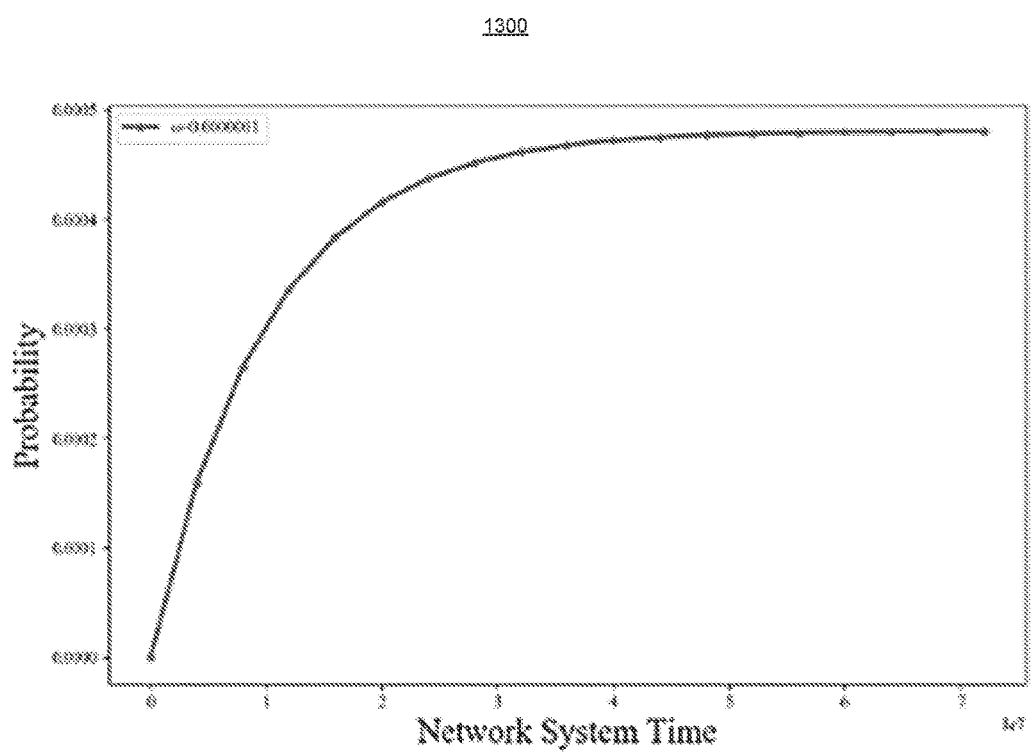
FIG. 13 is a schematic diagram of a PE probability of a general attack (w=0.0000001), in accordance with some embodiments of the present disclosure.
Figure 14:
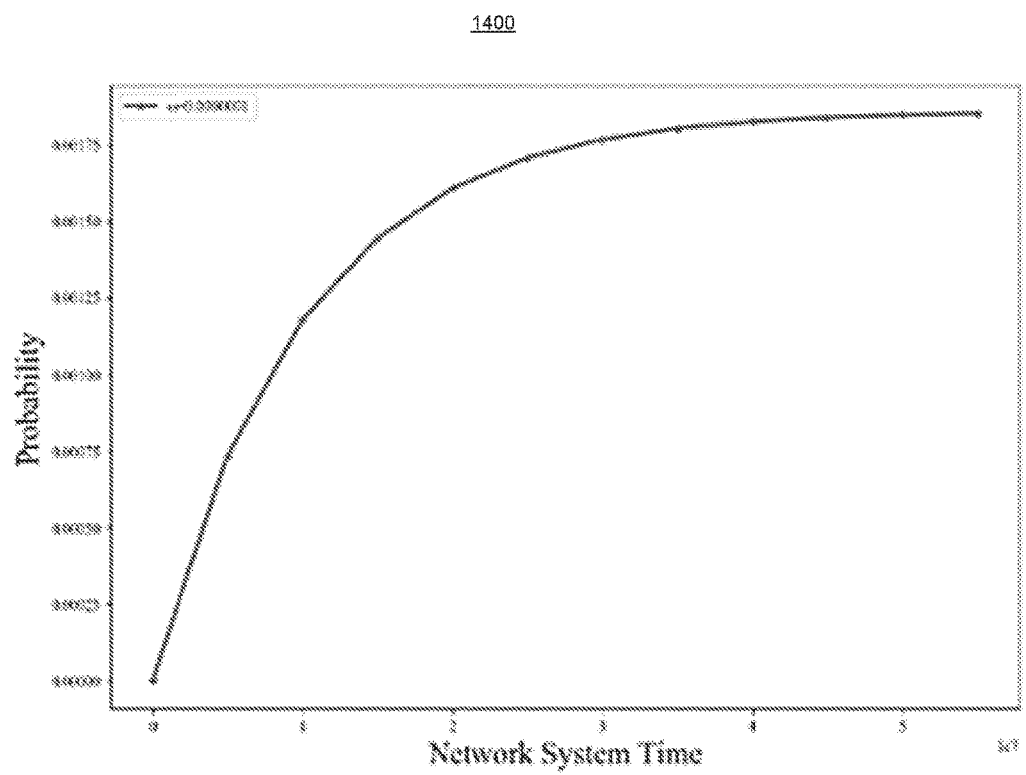
FIG. 14 is a schematic diagram of a PE probability of a special attack (w=0.0000001), in accordance with some embodiments of the present disclosure.

We take different stochastic disturbing frequencies and test the system to achieve stable time under general attack and special attack. As a test, the present disclosure takes ω=0.0000001. According to the above assumption, "second" is still used as the minimum clock cycle unit of stochastic disturbing. That is, every 1 second, the system performs a stochastic disturbing with the probability ω. At this time, the system takes three active stochastic disturbing every year, as shown in FIGS. 13 and 14.

The probability of a general attack that the present disclosure is stuck into the PE at 4000,000 seconds reaches the steady state probability at this time. The time for the special attack system to reach steady state is approximately 3.5*10^7 seconds.

Take ω=0.00005, that is, take an active stochastic disturbing every 5.56 hours. At this time, the steady-state probability of the general attack $P_E$ is 9.818886862753E-07, and the steady-state probability of the special attack $P_E$ is 3.7266553 E-06.

Figure 15:
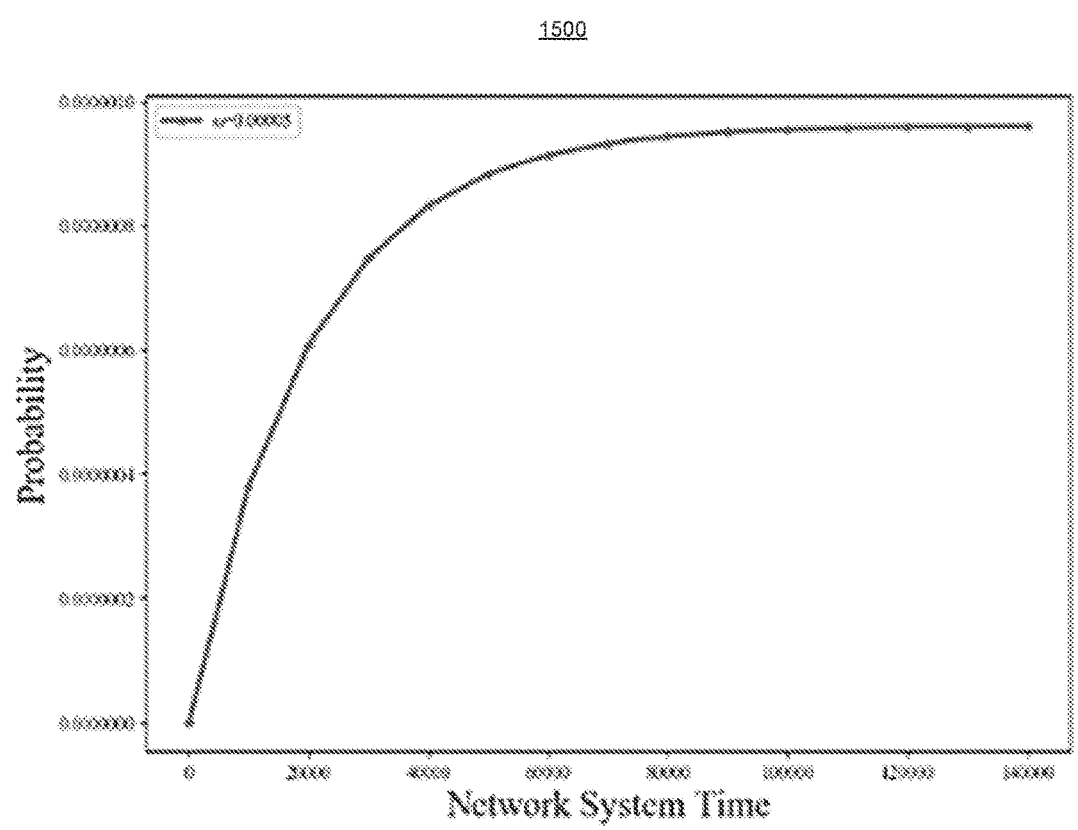
FIG. 15 is a schematic diagram of a PE probability of a general attack (w=0.00005), in accordance with some embodiments of the present disclosure.
Figure 16:
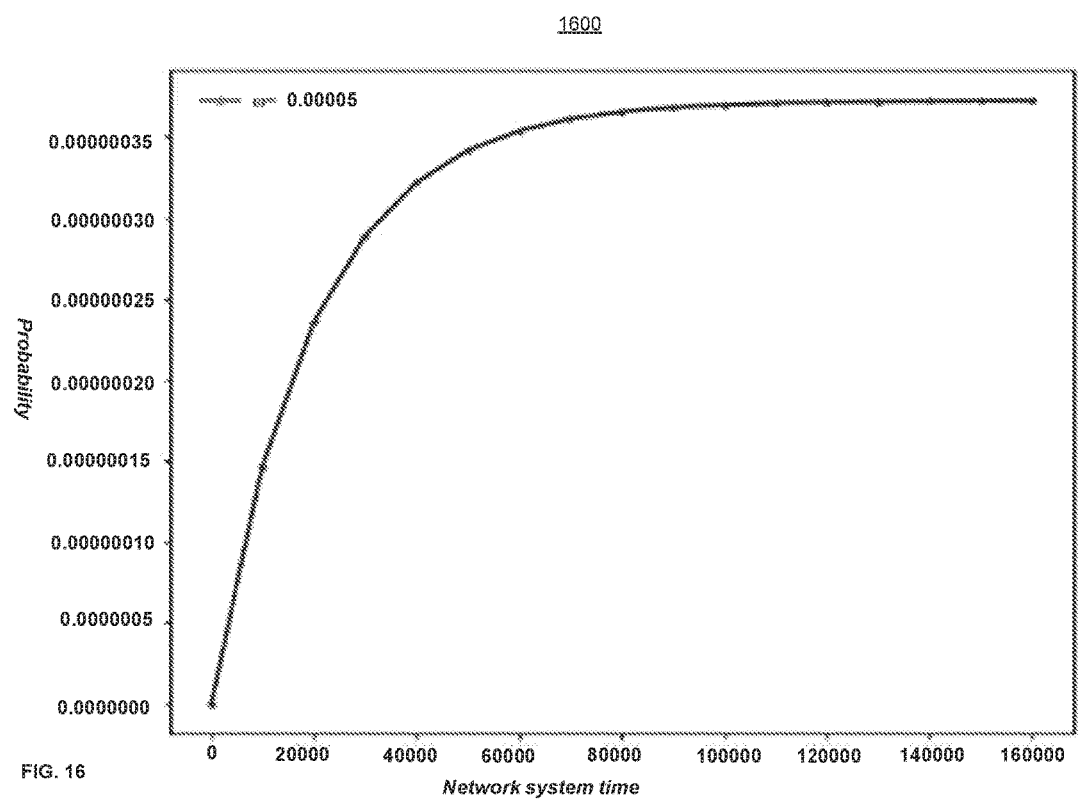
FIG. 16 is a schematic diagram of a PE probability of a special attack (w=0.00005), in accordance with some embodiments of the present disclosure.

In this case, P ($P_E$) changes with time, as shown in FIGS. 15 and 16.

According to FIGS. 15 and 16, we can get the time when the system reaches the steady state probability. In this example, the system reaches a steady state after about 90000 seconds in a general attack, and falls into the state $P_E$ with a probability of 9.62E-07; after a special attack, it takes about 70,000 seconds to reach a steady state, with the probability 3.72 E-06 to fall into state $P_E$.

It can be seen from these two examples that under the same stochastic disturbing frequency, the general attack has a lower exfiltration probability than the special attack, and the system enters the stable time longer.

Mastering this rule, we analyze the stochastic disturbing frequency in both attacked and working situations.

Suggested Defenses Under Different Attack Scenarios

Figure 17:
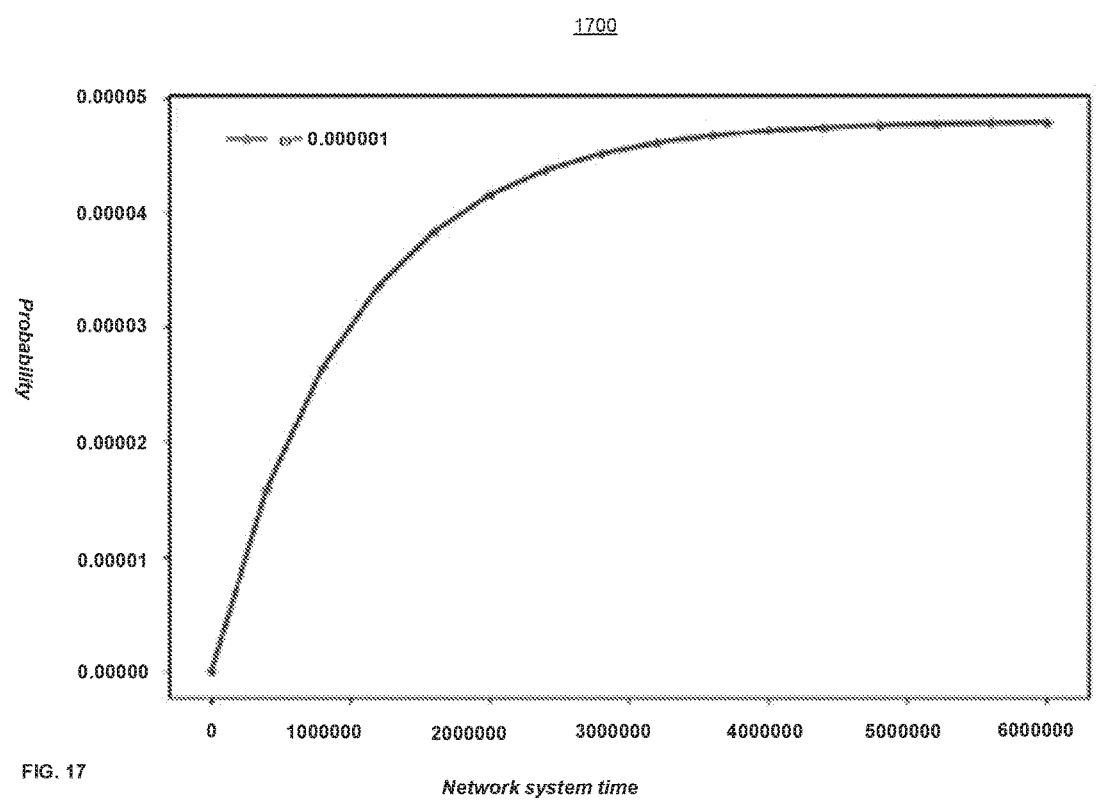
FIG. 17 is a $P_E$ probability diagram (w=0.000001), in accordance with some embodiments of the present disclosure.

When the system is not attacked or subjected to low-frequency low-intensity general attacks, we choose a lower stochastic disturbing frequency in exchange for general security. Here we take a general attack, which ω=0.000001, that is, every ten days or so, the corresponding attack downlink probability at this time is P($P_E$)=0.000048. In this case, the P($P_E$) curve as a function of time is shown in FIG. 17.

After about 4000000 system clocks, the PE can reach a steady state, that is, u=0.000048, ω=0.000001, assuming the attack chain length is 10, then $$E[S] = \frac{\theta}{[(1-\omega)\mu - \omega]} \quad (26)$$
$$= 10/[(1 - 0.000001)*0.000048 - 0.000001]$$
$$= 212766.17$$

The time to success of the attack target node is expected to be E[T]=212766.17*4000000=8.51*10^12 seconds, about 26987 years.

That is to say, for an attack chain with 10 nodes long, the attacker wants to attack the target node successfully and needs to complete about 212766 general attacks on a single node, and many times when the attacker attacks a single node. The mimic judgment finds and evictions. If only the system considers the maximum attack success rate for the PE to reach the steady-state probability, and the defender does not strengthen the defense, it will always change with the actual stochastic disturbing probability of 0.0003, and the attacker will spend 8.51*10^12 seconds. The attack was successfully attacked.

Crisis Defense

When the system is subjected to special attacks with high-frequency or other needs to strengthen defense, we choose a higher stochastic disturbing frequency for higher security. Here we take a special attack, which ω=0.0005, that is, stochastic disturbing produced every 0.55 hours. At this time, the probability of attack down is P($P_E$)=0.00000037.

Figure 18:
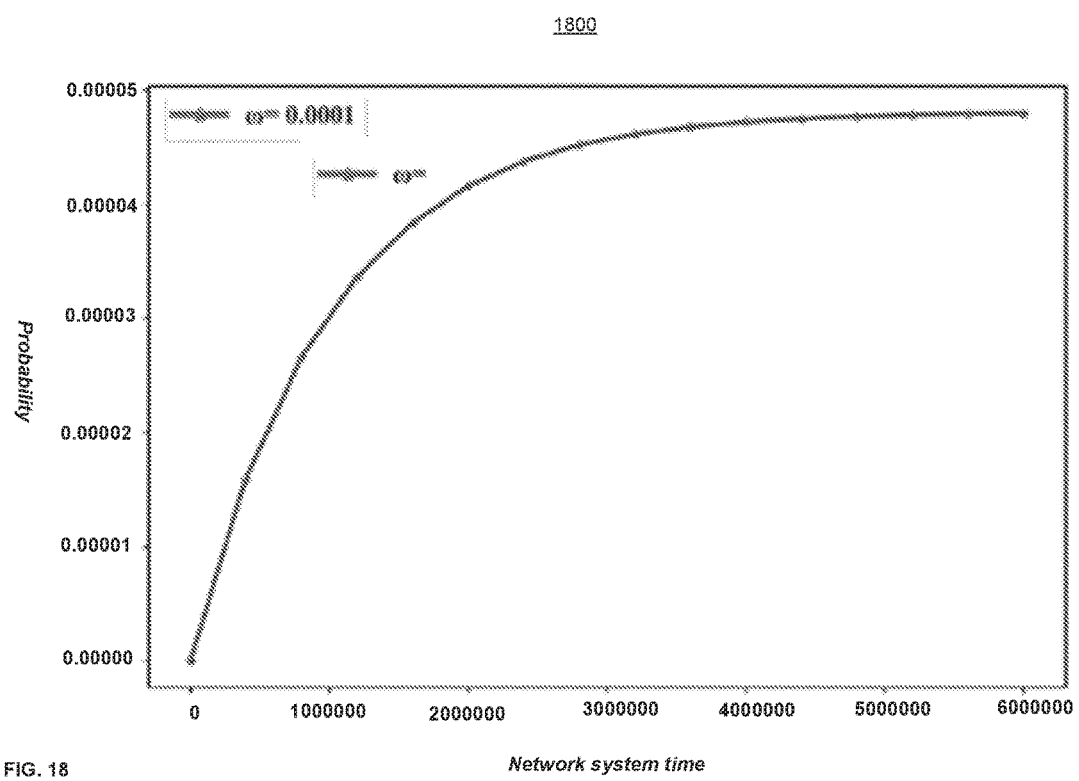
FIG. 18 is a $P_E$ probability diagram (w=0.0005), in accordance with some embodiments of the present disclosure.

In this case, P ($P_E$) changes with time, as shown in FIG. 18. After about 8000 system clocks, it can reach a steady state, that is, μ=0.00000037, ω=0.0005, assuming the attack chain length is 10, then $$E[S] = \frac{\theta}{[(1-\omega)\mu - \omega]} \quad (27)$$
$$= 10/[(1 - 0.0005)*0.00000037 - 0.0005]$$
$$= 20015$$

The time to successfully attack the target node is expected to be E[T]=−20015*8000=−1.6*10^8 seconds, about 5 years.

At this time, the number of steps has a negative value. The negative value indicates that in the attack chain, the probability of attack downlink is lower than the probability of uplink. In other words, the attack cannot be downlinked along the attack chain, but it will be randomized once and for all, disturbed, and cleared out of the system. The meaning of this example is that for a 10-node long attack chain, the defender wants to clear the attacker out of the attack chain, and the attacker needs to complete about 20015 special attacks on a single node. If only the attack of the system reaches the maximum attack success rate (the $P_E$ reaches the steady state probability), the attacker cannot descend along the attack chain, and 1.6*10^8 seconds will be removed from the attack chain after about five years.

APPENDIX TABLE 1

COMPLETE PLACES IN THE GSPN MODEL

| Location | Meaning |
| --- | --- |
| $P_0$ | The system is running normally and has not been attacked. |
| $P_1$ | There is one attacked executor which outputs tampered result to the voter and waits for arbitrating. |
| $P_{1W}$ | The other two executors have not outputted the result, so the attacker can launch attack to the second executor. |
| $P_{(1,B)}$ | Result from the attacked executor is arbitrated with the other two as the non-specific perception stage. |
| $P_2$ | There are two attacked executors which outputs tampered results to the voter and waits for arbitrating. |
| $P_{2W}$ | The other executors has not outputted the result, so the attacker can launch attack to the last executor. |
| $P_{(2,D)}$ | Results from the two attacked executor is arbitrated with the other one as the pervasion stage. |
| $P_{(2,D2)}$ | Results from the two attacked executor is arbitrated with the other one as the pervasion stage again. |
| $P_{(2,e)}$ | Results from the two attacked executor is arbitrated with the other one as the attrition stage. |
| $P_3$ | There are three attacked executors that outputs tampered results to the voter and waits for arbitrating. |
| $P_{(3,D)}$ | Results from the three attacked executor are arbitrated as the pervasion stage. |
| $P_{(3,C)}$ | Results from the three attacked executor are arbitrated as the attrition stage. |

APPENDIX TABLE 1-continued

COMPLETE PLACES IN THE GSPN MODEL

| Location | Meaning |
|---|---|
| $P_E$ | Results from the three attacked executor are arbitrated as the exfiltration stage. |
| $P_{01}$ | Attack the first layer on the first executor through a vulnerability attack |
| $P_{021}$ | For the first executor to overcome its second layer configuration through the first vulnerability in the second layer |
| $P_{022}$ | For the first executor to overcome its second layer configuration through the second layer of the second vulnerability |
| $P_{023}$ | For the first executor to overcome its second layer configuration through the third layer of the third vulnerability |
| $P_{024}$ | For the first executor to overcome its second layer configuration through the fourth layer of the fourth vulnerability |
| $P_{025}$ | For the first executor to overcome its second layer configuration through the second layer of the fifth vulnerability |
| $P_{026}$ | For the first executor to overcome its second layer configuration through the second layer of the sixth vulnerability |
| $P_{031}$ | For the first executor to overcome its Layer 3 configuration through Layer 3 first vulnerability |
| $P_{032}$ | For the first executor to overcome its Layer 3 configuration through Layer 3 second vulnerability |
| $P_{111}$ | For the second executor to overcome its second layer configuration through the first layer of the first vulnerability |
| $P_{112}$ | For the second executor to overcome its second layer configuration through the first layer of the second vulnerability |
| $P_{121}$ | For the second executor to overcome its second layer configuration through the second layer of the first vulnerability |
| $P_{122}$ | For the second executor to overcome its second layer configuration through the second layer of the second vulnerability |
| $P_{123}$ | For the second executor to overcome its second layer configuration through the second layer of the third vulnerability |
| $P_{124}$ | For the second executor to overcome its second layer configuration through the second layer of the fourth vulnerability |
| $P_{131}$ | For the second executor to overcome its third layer configuration through the third layer of the first vulnerability |
| $P_{132}$ | For the second executor to overcome its third layer configuration through the third layer of the second vulnerability |
| $P_{21}$ | Attack the first layer configuration on the third executor through a vulnerability attack |
| $P_{221}$ | For the third executor to overcome its second layer configuration through the second layer of the first vulnerability |
| $P_{222}$ | For the third executor to overcome its second layer configuration through the second layer of the second vulnerability |
| $P_{223}$ | For the third executor to overcome its second layer configuration through the second layer of the third vulnerability |
| $P_{224}$ | For the third executor to overcome its second layer configuration through the second layer of the fourth vulnerability |
| $P_{231}$ | For the third executor to overcome its second layer configuration through the third layer of the first vulnerability |
| $P_{232}$ | For the third executor to overcome its second layer configuration through the third layer of the second vulnerability |
| $P_{233}$ | For the third executor to overcome its second layer configuration through the third layer of the third vulnerability |
| $P_{234}$ | For the third executor to overcome its second layer configuration through the third layer of the fourth vulnerability |
| $P_{235}$ | For the third executor to overcome its second layer configuration through the third layer of the fifth vulnerability |
| $P_{236}$ | For the third executor to overcome its second layer configuration through the third layer of the sixth vulnerability |

APPENDIX TABLE 2

COMPLETE TRANSITIONS IN THE GSPN MODEL

| Transition | Behavior Description | Direction of Behavior | Specific attack parameter | General attack parameter |
|---|---|---|---|---|
| $t_{(1, B, j)}$ | Mimic judgment | Determined as B state when an executor is attacked | 0.3032 | 0.4883 |
| $t_{(1, 2)}$ | The attacker can continue to attack the second executor. | From attacking the first executor to the second executor | 0.6968 | 0,5117 |
| $t_{(B, 0, D)}$ | The mimic system expels the suspicious executor | After the B attack occurs, the system is returned to normal operation by the eviction system. | 1 | 1 |
| $t_{(2, D, J)}$ | Mimic judgment | Two executors were attacked and judged as D state | 0.0001*0.6988 | 0.0001*0.9093 |
| $t_{(2, C, J)}$ | Mimic judgment | Two executors were attacked and judged as C state | (1-0.0001)* 0.6988 | (1-0.0001)* 0.9093 |
| $t_{(1, 2)}$ | The attacker can continue to attack the third executor. | From attacking the second executor to the third executor | 1-0.6988 | (1-0.9093) |
| $t_{(D, 2, M)}$ | The defender made a false eviction | After the D attack occurs, the defense result is that there are still two executors being attacked. | 1 | 1 |
| $t_{(2, 0, D)}$ | Defenders expel an error-consistent executor | After the D attack occurs, the defense result returns to the normal state. | ½ | ½ |
| $t_{(2, 0, S)}$ | The defense system has disabled the suspicious executor | When the two executors are attacked, they are deactivated and returned to normal operation. | ⅓ | ⅓ |
| $t_{(3, D, j)}$ | Mimic judgment, at this time three executors are attacked | When the three executors are attacked, they are judged as D state. | 3*0,0001* (1-0,0001) | 3*0.0001* (1-0.0001) |
| $t_{(3, C, J)}$ | Mimic judgment | The three executors were attacked and sentenced to state C. | (1-0,0001)* (1-2*0,0001) | (1-0.0000* (1-2*0.0001) |

APPENDIX TABLE 2-continued

COMPLETE TRANSITIONS IN THE GSPN MODEL

| Transition | Behavior Description | Direction of Behavior | Specific attack parameter | General attack parameter |
|---|---|---|---|---|
| $t_{(E, J)}$ | Mimic judgment | Judgment is state E | 0.0001*0.0001 | 0.0001*0.0001 |
| $t_{(3, 2, M)}$ | The defender took the wrong eviction | When the three executors are attacked, the system migrates to the two executors being attacked. | 1 | 1 |
| $t_{(3, 2, S)}$ | The defender deactivated the suspicious executor | The three executors are attacked, and the defensive behavior returns to the two executors being attacked. | 1/3 | 1/3 |
| $t_{(3, 0)}$ | The defender stochastically perturbs the nodes in the link and the node is selected | The three executors are attacked and returned to normal working state. | 0.00001 | 0.00001 |
| $t_{001}$ | Vulnerability attack on Layer 1 configuration of the first executor | From the first executor of the 0 layer to the 1 layer (normal operation) | 1/2.8 | 1/2.8 |
| $t_{0121}$ | Attack on the first vulnerability of the second layer of the first executor | From the first executor of the 1 layer to the 2 layer | 1/3.9 | 1/3.9 |
| $t_{0122}$ | Attack on the second vulnerability of the second layer of the first executor | From the first executor of the 1 layer to the 2 layer | 1/2.2 | 1/2.2 |
| $t_{0123}$ | Attack on the third vulnerability of the second layer of the first executor | From the first executor of the 1 layer to the 2 layer | 1/3.9 | 1/3.9 |
| $t_{0124}$ | Attack on the fourth vulnerability of the second layer of the first executor | From the first executor of the 1 layer to the 2 layer | 1/2.2 | 1/2.2 |
| $t_{0125}$ | Attack on the fifth vulnerability of the second layer of the first executor | From the first executor of the 1 layer to the 2 layer | 1/2.2 | 1/2.2 |
| $t_{0126}$ | Attack on the sixth vulnerability of the second layer of the first executor | From the first executor of the 1 layer to the 2 layer | 1/3.9 | 1/3.9 |
| $t_{0231}$ | Attack on the first vulnerability of the third layer of the first executor | From the first executor of the 2 layer of the 1 vulnerability to the 3 layer | 1/1.8 | 1/1.8 |
| $t_{0232}$ | Attack on the second vulnerability of the Layer 3 configuration of the first executor | From the first executor of the 2 layer of the 1 vulnerability to the 3 layer | 1/3.1 | 1/3.1 |
| $t_{0233}$ | Attack on the first vulnerability of the third layer of the first executor | From the first executor of the 2 layer of the 2 vulnerability to the 3 layer | 1/1.8 | 1/1.8 |
| $t_{0234}$ | Attack on the second vulnerability of the Layer 3 configuration of the first executor | From the first executor of the 2 layer of the 2 vulnerability to the 3 layer | 1/3.1 | 1/3.1 |
| $t_{0235}$ | Attack on the first vulnerability of the third layer of the first executor | From the first executor of the 2 layer of the 3 vulnerability to the 3 layer | 1/1.8 | 1/1.8 |
| $t_{0236}$ | Attack on the second vulnerability of the Layer 3 configuration of the first executor | From the first executor of the 2 layer of the 3 vulnerability to the 3 layer | 1/3.1 | 1/3.1 |
| $t_{0237}$ | Attack on the first vulnerability of the third layer of the first executor | From the first executor of the 2 layer of the 4 vulnerability to the 3 layer | 1/1.8 | 1/1.8 |
| $t_{0238}$ | Attack on the second vulnerability of the Layer 3 configuration of the first executor | From the first executor of the 2 layer of the 4 vulnerability to the 3 layer | 1/3.1 | 1/3.1 |
| $t_{0239}$ | Attack on the first vulnerability of the Layer 3 of the first executor | From the first executor of the 2 layer of the 5 vulnerability to the 3 layer | 1/1.8 | 1/1.8 |
| $t_{02310}$ | Attack on the second vulnerability of the Layer 3 configuration of the first executor | From the first executor of the 2 layer of the 5 vulnerability to the 3 layer | 1/3.1 | 1/3.1 |

APPENDIX TABLE 2-continued

COMPLETE TRANSITIONS IN THE GSPN MODEL

| Transition | Behavior Description | Direction of Behavior | Specific attack parameter | General attack parameter |
|---|---|---|---|---|
| $t_{02311}$ | Attack on the first vulnerability of the third layer of the first executor | From the first executor of the 2 layer of the 6 vulnerability to the 3 layer | 1/1.8 | 1/1.8 |
| $t_{02312}$ | Attack on the second vulnerability of the Layer 3 configuration of the first executor | From the first executor of the 2 layer of the 6 vulnerability to the 3 layer | 1/3.1 | 1/3.1 |
| $t_{0w1}$ | Waiting for a mimic judging or attacking the next executor | From the first executor to the second executor | | |
| $t_{0w2}$ | Waiting for a mimic judging or attacking the next executor | From the first executor to the second executor | | |
| $t_{1011}$ | Attack on the first vulnerability of the Layer 1 configuration of the second executor | From the 2nd executor of the 0 layer to the 1 layer | 1/1.6 | 1/1.6 |
| $t_{1012}$ | Attack on the second vulnerability of the Layer 1 configuration of the second executor | From the 2nd executor of the 0 layer to the 1 layer | 1/2.8 | 1/2.8 |
| $t_{1121}$ | Attack on the first vulnerability of the second layer of the second executor | From the 2nd executor of the 1 layer of the 1 vulnerability to the 2 layer | 1/3.9 | 1/3.9 |
| $t_{1122}$ | Attack on the first vulnerability of the second layer of the second executor | From the 2nd executor of the 1 layer of the 1 vulnerability to the 2 layer | 1/3.9 | 1/3.9 |
| $t_{1123}$ | Attack on the second vulnerability of the second layer of the second executor | From the 2nd executor of the 1 layer of the 1 vulnerability to the 2 layer | 1/2.2 | 1/2.2 |
| $t_{1124}$ | Attack on the second vulnerability of the second layer of the second executor | From the 2nd executor of the 1 layer of the 2 vulnerability to the 2 layer | 1/2.2 | 1/2.2 |
| $t_{1125}$ | Attack on the third vulnerability of the second layer of the second executor | From the 2nd executor of the 1 layer of the 1 vulnerability to the 2 layer | 1/3.9 | 1/3.9 |
| $t_{1126}$ | Attack on the third vulnerability of the second layer of the second executor | From the 2nd executor of the 1 layer of the 2 vulnerability to the 2 layer | 1/3.9 | 1/3.9 |
| $t_{1127}$ | Attack on the fourth vulnerability of the second layer of the second executor | From the 2nd executor of the 1 layer of the 1 vulnerability to the 2 layer | 1/2.2 | 1/2.2 |
| $t_{1128}$ | Attack on the fourth vulnerability of the second layer of the second executor | From the 2nd executor of the 1 layer of the 2 vulnerability to the 2 layer | 1/2.2 | 1/2.2 |
| $t_{1231}$ | Attack on the first vulnerability of the third layer of the second executor | From the 2nd executor of the 2 layer of the 1 vulnerability to the 3 layer | 2/1.8 | 1/1.8 |
| $t_{1232}$ | Attack on the second vulnerability of the Layer 2 configuration of the second executor | From the 2nd executor of the 2 layer of the 1 vulnerability to the 3 layer | 2/3.1 | 1/3.1 |
| $t_{1233}$ | Attack on the first vulnerability of the third layer of the second executor | From the 2nd executor of the 2 layer of the 2 vulnerability to the 3 layer | 2/1.8 | 1/1.8 |
| $t_{1234}$ | Attack on the second vulnerability of the Layer 2 configuration of the second executor | From the 2nd executor of the 2 layer of the 2 vulnerability to the 3 layer | 2/3.1 | 1/3.1 |
| $t_{1235}$ | Attack on the first vulnerability of the third layer of the second executor | From the 2nd executor of the 2 layer of the 3 vulnerability to the 3 layer | 2/1.8 | 1/1.8 |

APPENDIX TABLE 2-continued

COMPLETE TRANSITIONS IN THE GSPN MODEL

| Transition | Behavior Description | Direction of Behavior | Specific attack parameter | General attack parameter |
|---|---|---|---|---|
| $t_{1236}$ | Attack on the second vulnerability of the Layer 2 configuration of the second executor | From the 2nd executor of the 2 layer of the 3 vulnerability to the 3 layer | 2/3.1 | 1/3.1 |
| $t_{1237}$ | Attack on the first vulnerability of the third layer of the second executor | From the 2nd executor of the 2 layer of the 4 vulnerability to the 3 layer | 2/1.8 | 1/1.8 |
| $t_{1238}$ | Attack on the second vulnerability of the Layer 2 configuration of the second executor | From the 2nd executor of the 2 layer of the 4 vulnerability to the 3 layer | 2/3.1 | 1/3.1 |
| $t_{1w1}$ | Waiting for a mimic judging or attacking the next executor | From the second executor to the third executor | | |
| $t_{1w2}$ | Waiting for a mimic judging or attacking the next executor | From the second executor to the third executor | | |
| $t_{201}$ | Attack on vulnerabilities in Layer 1 configuration of the third executor | From the 3rd executor of the 0 layer to the 1 layer | 2/2.8 | 1/2.8 |
| $t_{2121}$ | Attack on the first vulnerability of the Layer 2 configuration of the third executor | From the 3rd executor of the 1 layer to the 2 layer | 2/3.9 | 1/3.9 |
| $t_{2122}$ | Attack on the second vulnerability of the Layer 2 configuration of the third executor | From the 3rd executor of the 1 layer to the 2 layer | 2/3.9 | 1/3.9 |
| $t_{2123}$ | Attack on the third vulnerability of the Layer 2 configuration of the third executor | From the 3rd executor of the 1 layer to the 2 layer | 2/2.2 | 1/2.2 |
| $t_{2124}$ | Attack on the fourth vulnerability of the Layer 2 configuration of the third executor | From the 3rd executor of the 1 layer to the 2 layer | 2/2.2 | 1/2.2 |
| $t_{2231}$ | Attack on the first vulnerability of the third layer of the third executor | From the 3rd executor of the 2 layer of the 1 vulnerability to the 3 layer | 1/3.9 | 1/3.9 |
| $t_{2231}$ | Attack on the first vulnerability of the third layer of the third executor | From the 3rd executor of the 2 layer of the 2 vulnerability to the 3 layer | 1/3.9 | 1/3.9 |
| $t_{2233}$ | Attack on the first vulnerability of the third layer of the third executor | From the 3rd executor of the 2 layer of the 3 vulnerability to the 3 layer | 1/3.9 | 1/3.9 |
| $t_{2234}$ | Attack on the first vulnerability of the third layer of the third executor | From the 3rd executor of the 2 layer of the 4 vulnerability to the 3 layer | 1/3.9 | 1/3.9 |
| $t_{2235}$ | Attack on the second vulnerability of the third layer of the third executor | From the 3rd executor of the 2 layer of the 1 vulnerability to the 3 layer | 1/3.9 | 1/3.9 |
| $t_{2236}$ | Attack on the second vulnerability of the third layer of the third executor | From the 3rd executor of the 2 layer of the 2 vulnerability to the 3 layer | 1/3.9 | 1/3.9 |
| $t_{2237}$ | Attack on the second vulnerability of the third layer of the third executor | From the 3rd executor of the 2 layer of the 3 vulnerability to the 3 layer | 1/3.9 | 1/3.9 |
| $t_{2238}$ | Attack on the second vulnerability of the third layer of the third executor | From the 2nd executor of the 2 layer of the 4 vulnerability to the 3 layer | 1/3.9 | 1/3.9 |
| $t_{2239}$ | Attack on the third vulnerability of the third layer of the third executor | From the 3rd executor of the 2 layer of the 1 vulnerability to the 3 layer | 1/2.2 | 1/2.2 |

APPENDIX TABLE 2-continued

COMPLETE TRANSITIONS IN THE GSPN MODEL

| Transition | Behavior Description | Direction of Behavior | Specific attack parameter | General attack parameter |
|---|---|---|---|---|
| $t_{22310}$ | Attack on the third vulnerability of the third layer of the third executor | From the 3rd executor of the 2 layer of the 2 vulnerability to the 3 layer | 1/2.2 | 1/2.2 |
| $t_{22311}$ | Attack on the third vulnerability of the third layer of the third executor | From the 3rd executor of the 2 layer of the 3 vulnerability to the 3 layer | 1/2.2 | 1/2.2 |
| $t_{22312}$ | Attack on the third vulnerability of the third layer of the third executor | From the 3rd executor of the 2 layer of the 4 vulnerability to the 3 layer | 1/2.2 | 1/2.2 |
| $t_{22313}$ | Attack on the fourth vulnerability of the third layer of the third executor | From the 3rd executor of the 2 layer of the 1 vulnerability to the 3 layer | 1/3.9 | 1/3.9 |
| $t_{22314}$ | Attack on the fourth vulnerability of the third layer of the third executor | From the 3rd executor of the 2 layer of the 2 vulnerability to the 3 layer | 1/3.9 | 1/3.9 |
| $t_{22315}$ | Attack on the fourth vulnerability of the third layer of the third executor | From the 3rd executor of the 2 layer of the 3 vulnerability to the 3 layer | 1/3.9 | 1/3.9 |
| $t_{22316}$ | Attack on the fourth vulnerability of the third layer of the third executor | From the 3rd executor of the 2 layer of the 4 vulnerability to the 3 layer | 1/3.9 | 1/3.9 |
| $t_{22317}$ | Attack on the fifth vulnerability of the third layer of the third executor | From the 3rd executor of the 2 layer of the 1 vulnerability to the 3 layer | 1/3.9 | 1/3.9 |
| $t_{22318}$ | Attack on the fifth vulnerability of the third layer of the third executor | From the 3rd executor of the 2 layer of the 2 vulnerability to the 3 layer | 1/3.9 | 1/3.9 |
| $t_{22319}$ | Attack on the fifth vulnerability of the third layer of the third executor | From the 3rd executor of the 2 layer of the 3 vulnerability to the 3 layer | 1/3.9 | 1/3.9 |
| $t_{22320}$ | Attack on the fifth vulnerability of the third layer of the third executor | From the 3rd executor of the 2 layer of the 4 vulnerability to the 3 layer | 1/3.9 | 1/3.9 |
| $t_{22321}$ | Attack on the 6th vulnerability of the 3rd vulnerability to the 3 layer layer configuration of the 3rd executor | From the 3rd executor of the 2 layer of the 1 vulnerability to the 3 layer | 1/3.9 | 1/3.9 |
| $t_{22322}$ | Attack on the 6th vulnerability of the 3rd layer configuration of the 3rd | From the 3rd executor of the 2 layer of the 2 vulnerability to the 3 layer executor | 1/3.9 | 1/3.9 |
| $t_{22323}$ | Attack on the 6th vulnerability of the 3rd vulnerability to the 3 layer layer configuration of the 3rd executor | From the 3rd executor of the 2 layer of the 3 | 1/3.9 | 1/3.9 |
| $t_{22324}$ | Attack on the 6th vulnerability of the 3rd layer configuration of the 3rd executor | From the 3rd executor of the 2 layer of the 4 vulnerability to the 3 layer | 1/3.9 | 1/3.9 |
| $t_{2w1}$ | Waiting for a mimic judging or attacking the next executor | Ending from the third executor | | |
| $t_{2w2}$ | Waiting for a mimic judging or attacking the next executor | Ending from the third executor | | |
| $t_{2w3}$ | Waiting for a mimic judging or attacking the next executor | Ending from the third executor | | |
| $t_{2w4}$ | Waiting for a mimic judging or attacking the next executor | Ending from the third executor | | |
| $t_{2w5}$ | Waiting for a mimic judging or attacking the next executor | Ending from the third executor | | |

APPENDIX TABLE 2-continued

COMPLETE TRANSITIONS IN THE GSPN MODEL

| Transition | Behavior Description | Direction of Behavior | Specific attack parameter | General attack parameter |
|---|---|---|---|---|
| $t_{2w6}$ | Waiting for a mimic judging or attacking the next executor | Ending from the third executor | | |

Figure 19:
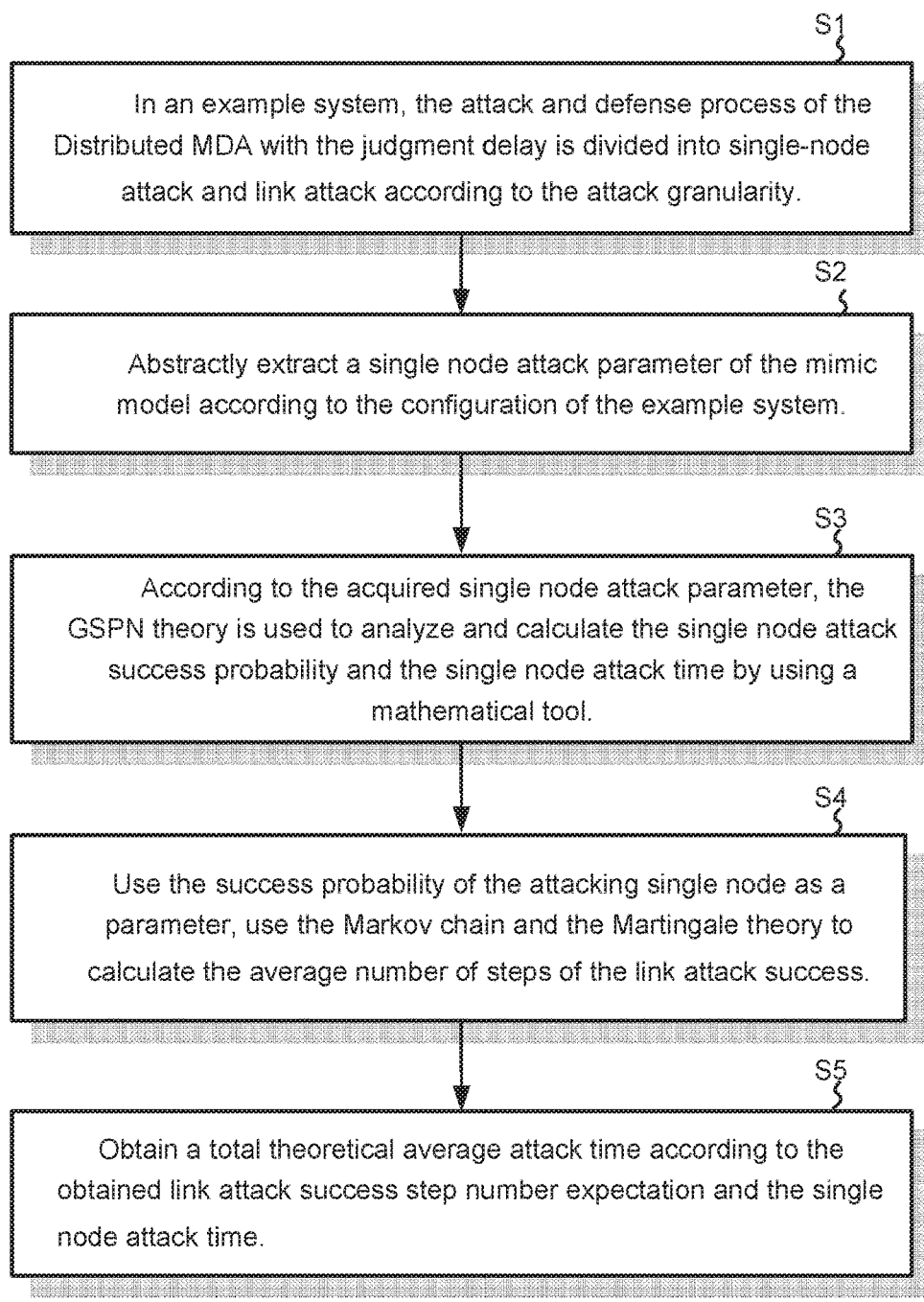
FIG. 19 is a flowchart illustrating an example method for anti-attacking modeling CMD systems based on GSPN and martingale theory, in accordance with some embodiments of the present disclosure.

FIG. 19 is a flowchart illustrating an example method 1900 for anti-attacking modeling CMD systems based on GSPN and martingale theory, in accordance with some embodiments of the present disclosure.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures, and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method for anti-attacking modelling for Cyber Mimic Defense (CMD) hardware computer systems based on Generalized Stochastic Petri Net (GSPN) theory and Martingale theory comprising:

S1. dividing attack and defense processes initiated by attacker computer nodes and defender computer nodes associated with a hardware-based computer network system into first one or more single-node attacks initiated by the attacker computer nodes and second one or more link attacks initiated by the defender computer nodes based on attack granularity;

S2. determining one or more single-node attack parameters associated with the hardware-based computer network system based at least on a hardware configuration of the hardware-based computer network system;

S3. calculating (1) success probability and (2) time length of a single-node attack by applying a GSPN theory to mathematically analyze the determined one or more single-node attack parameters;

S4. based on the success probability of the single-node attack, using a Markov chain and a Martingale theory to calculate an average number of steps required for a successful link attack; and S5. calculating a total theoretical average attack time based on the average number of steps required for a successful link attack and the time length of a single-node attack.

2. The method for anti-attacking modelling for CMD systems based on GSPN and Martingale theory of claim 1, wherein the single node attack is an attack on an independently functional component which is a single hardware computer node, and defense behaviors reactive to the attack include driving (D), mis-driving (M), stop (S), and judgment (J).

3. The method for anti-attacking modelling for CMD systems based on GSPN and Martingale theory of claim 2, wherein the GSPN theory in the step S3 is that an attacker and a defender behave according to a gaming theory, wherein different behaviors of the attacker and the defender generate different output states of the single hardware computer node based on (1) a game theory and (2) a selected GSPN model, wherein the GSPN model is selected using steps below includes:

S31. identifying an attacker's behavior and impact of the attacker to establish a generalized stochastic Petri network of the attacker's perspective;

S32. identifying a defensive behavior and effect of establishing a defensive perspective of the Generalized Stochastic Petri Network; and S33. combining the generalized stochastic Petri network behaviors and states of the attacker's perspective and the defender's perspective to establish a system generalized stochastic Petri network.

4. The method for anti-attacking modelling for CMD systems based on GSPN and Martingale theory of claim 3, wherein attacking behaviors and defensive behaviors of the attacker and the defender in the game result in the hardware-based computer network system produces at least four different states: normal work (A), non-specific perception (B), attrition (C), pervasion (D), and exfiltration (E);

wherein the normal work (A) is a state in which,
the attacker does not launch an attack or does not succeed in launching an attack, and all executors are in normal operation;

wherein the non-specific perception (B) is a state in which, that
when the attacker successfully attacks less than half of total executors,
the hardware-based computer network system finds that outputs of attacked executors are inconsistent with outputs of other executors in multiple judgements, and
additional executors replace executors that are not attacked in a heterogeneous pool, causing the attacker's attack to fail;

wherein the attrition (C) is a state in which,
the attacker successfully attacks a majority of all executors, but fails to produce control a same erroneous output; or the attacker attacks all the executors successfully, causing the outputs to be inconsistent, and
wherein either of which causes the hardware-based computer network system attempts to obtain output results, but none of the output results occurs more than half of total number of the output results, causing the hardware-based computer network system to fail to determine which one or more executors have been attacked and thus to mark the all executors as suspicious and deactivated;

wherein the pervasion (D) is a state in which,
the attacker attacks a majority of all executors successfully, and produces a same erroneous output, causing the hardware-based computer network system to evict a functioning executor; or the attacker attacks all executors successfully, and more than half of all the executors produce a same erroneous output, causing the hardware-based computer network system to evict executors producing an inconsistent output; which not only fails to effectively remove the attacker from the hardware-based computer network system, but also consumes resources in the heterogeneous pool, causing the attack to spread; and wherein the exfiltration (E) is a state in which,
the attacker's attack capability is strong enough and the attack speed is fast enough to evade detection and attack all executors successfully, which causes attacked executors to produce a same output, before the CMD hardware computer system makes a judgement, and an arbitrator computer node to erroneously determine that an erroneous output is correct and allows executors that have been attacked to continue working.

5. The method for anti-attacking modelling for CMD systems based on GSPN and Martingale theory of claim 4, wherein the defensive behaviors of the attacker and the defensive behaviors of defender in the game theory cause the hardware-based computer network system to switch between the at least four different states using one or more mimic judgements.

6. The method for anti-attacking modelling for CMD systems based on GSPN and Martingale theory of claim 5, wherein after an attacker's successful attack on an executor, probability that a normal working computer node completes output is calculated as follows: $P_{1w}=P[N(t_a)-N(o)>0]$;

wherein after a generic attack on an executor has occurred, other functional executors produce K outputs, and probability that the hardware-based computer network system performs a mimic arbitration ($^t(1, B, J)$) is calculated as follows: $P_{IM}^{J}=P_{IM}^{K}$;

wherein after a generic attack on i executors, probability that other functional executors completed outputs is calculated as follows: $P_{2M}^{J}=P\{N(t_a+\alpha t_a+ \ldots +\alpha^{(i-1)} t_a)-N(0)>0\}$;

wherein probability that the hardware-based computer network system carries out a mimic judgement ($t_{(i, C, J)}+t_{(i, D, J)}$) is calculated as follows: $P_{iM}^{J}=P_{iM}^{K}$;

where $N(t)$ represents a total number of times an executor outputs a result in t time interval after beginning of a task distribution, and where $t_a$ represents time spent by the attacker attacking an executor;

wherein for a generic attack, $\alpha=1$, and for a special attack, $\alpha=0.5$, where N is total number of executors in the hardware-based computer network system, and K is a threshold of same number of output, $0<i<N-K$.

7. The method for anti-attacking modelling for CMD systems based on GSPN and Martingale theory of claim 6, wherein a link attack takes a steady state time of a single-node as an attack period of the hardware-based computer network system, and wherein the attacker advances along an attack chain, wherein, after each successful attack on a node, the attacker moves along the attack chain and determines whether the attacker encounters a mimic stochastic interference;

wherein when the attacker encounters a mimic stochastic interference,
the attacker moves one step back along the attack chain; and wherein when the attacker does not encounter a mimic stochastic interference, the attacker continues to attack a next node.

8. The method for anti-attacking modelling for CMD systems based on GSPN and Martingale theory of claim 7, wherein in the link attack, the attacker, in accordance with (1) whether the attacker encounters a mimic stochastic interference or not and (2) whether the attacker succeeds in attacking a single hardware computer node or not, is configured to carry out at least three different actions: back-off, move-forward, and stand-still.

9. The method for anti-attacking modelling for CMD systems based on GSPN and Martingale theory of claim 8, wherein the back-off is changed whether the attacker initiates an attack or not, as long as the system performs a stochastic disturbing, wherein the attacker will not be able to perform the attack on the node where the attacker is located or the target node that is attacking, wherein the attacker must fall back to the previous node that has been attacked, wherein the probability is $M_{i,j-i}=\omega$, wherein the probability of success of each node is u, and the probability that the system does not stochastically perturb the attack-related nodes during the transformation period is $(1-\omega)$, so the probability that the attacker successfully attacks the next node and does not have stochastic disturbing during the period is $M_{i,j+i}=(1-\omega)\mu$; wherein the stand-still motion is not successful for the attacker to attack the next node, and the system does not stochastically perturb the relevant node; wherein the state of the system remains unchanged, and its probability is $M_{i,j}=(1-\omega)(1-\mu)$.

10. The method for anti-attacking modelling for CMD systems based on GSPN and Martingale theory of claim 9, wherein step S4 further comprises:
S41. Creating a Markov chain by searching for an attack stop position according to a current state and attack scope associated with a next step;
S42. Converting the Markov chain created in S41 to a Martingale sequence;
S43. Calculating total number of steps required for the attacker to successfully attack a target node as follows:

$$E[S] = \frac{\theta}{[(1-\omega)(\mu-\omega)]};$$

and
S44. Calculating length of the attack chain based on probability of a successful attack on a single node and the total number of steps required to successfully attack the target node by the attacker calculated in S43, and calculating total steps needed to successfully attack the target node as follows:

$$E[S] = \frac{\theta}{[(1-\lambda(TE0))*P(PE) - \lambda(TE0)]};$$

and
where μ is probability that the attacker attacks a single node successfully,
where ω is probability of encountering an active stochastic interference at a single node,
where θ is the length of the attack chain,
where $\lambda(T_{E0})$ is the frequency at which the stochastic interference occurs, and
where $P(P_E)$ is probability of a single node is successfully attacked.

* * * * *